United States Patent
Toyoda et al.

(10) Patent No.: US 8,577,124 B2
(45) Date of Patent: Nov. 5, 2013

(54) METHOD AND APPARATUS OF PATTERN INSPECTION AND SEMICONDUCTOR INSPECTION SYSTEM USING THE SAME

(75) Inventors: Yasutaka Toyoda, Hitachi (JP); Akiyuki Sugiyama, Hitachinaka (JP); Ryoichi Matsuoka, Yotsukaido (JP); Takumichi Sutani, Hitachinaka (JP); Hidemitsu Naya, Hitachi (JP)

(73) Assignee: Hitachi High-Technologies Corporation, Tokyo (JP)

( * ) Notice: Subject to any disclaimer, the term of this patent is extended or adjusted under 35 U.S.C. 154(b) by 122 days.

(21) Appl. No.: 13/344,409

(22) Filed: Jan. 5, 2012

(65) Prior Publication Data

US 2012/0099781 A1   Apr. 26, 2012

Related U.S. Application Data

(63) Continuation of application No. 12/388,968, filed on Feb. 19, 2009, now Pat. No. 8,115,169, which is a continuation of application No. 11/453,229, filed on Jun. 15, 2006, now Pat. No. 7,507,961.

(30) Foreign Application Priority Data

Jun. 17, 2005  (JP) .................................. 2005-177121

(51) Int. Cl.
*G06K 9/00* (2006.01)
*G21K 7/00* (2006.01)
*G06F 17/50* (2006.01)

(52) U.S. Cl.
USPC ........... 382/145; 382/147; 382/148; 382/190; 382/203; 250/328; 250/370.08; 716/50; 716/55; 716/111

(58) Field of Classification Search
USPC ................. 250/306, 307, 310, 311, 328, 334, 250/370.08, 370.1, 491.1, 492.3, 582–584, 250/559.01–559.07; 382/141, 145, 147, 382/148, 190, 195, 199, 203; 716/50, 55, 716/101, 106, 110, 111, 119
See application file for complete search history.

(56) References Cited

U.S. PATENT DOCUMENTS

| 4,628,531 A | 12/1986 | Okamoto et al. |
| 5,185,812 A | 2/1993 | Yamashita et al. |

(Continued)

FOREIGN PATENT DOCUMENTS

| JP | 63-114231 | 5/1988 |
| JP | 6-34722 | 2/1994 |

(Continued)

OTHER PUBLICATIONS

Japanese Office Action, with partial English translation, issued in Japanese Patent Application No. 2005-177121, dated Sep. 1, 2009.

(Continued)

*Primary Examiner* — Bernard E Souw
(74) *Attorney, Agent, or Firm* — McDermott Will & Emery LLP

(57) ABSTRACT

A pattern inspection apparatus can be provided, for example, in a scanning electron microscope system. When patterns of a plurality of layers are included in a SEM image, the apparatus separates the patterns according to each layer by using design data of the plurality of layers corresponding to the patterns. Consequently, the apparatus can realize inspection with use of only the pattern of a target layer to be inspected, pattern inspection differently for different layers, or detection of a positional offset between the layers.

10 Claims, 21 Drawing Sheets

(56) References Cited

U.S. PATENT DOCUMENTS

| | | | |
|---|---|---|---|
| 5,982,933 | A | 11/1999 | Yoshii et al. |
| 6,064,484 | A | 5/2000 | Kobayashi et al. |
| 6,515,296 | B1 * | 2/2003 | Komatsu et al. ......... 250/559.44 |
| 6,586,341 | B2 | 7/2003 | Moniwa et al. |
| 6,883,160 | B2 | 4/2005 | Tsuchiya et al. |
| 7,106,895 | B1 | 9/2006 | Goldberg et al. |
| 7,209,584 | B2 | 4/2007 | Tsuchiya et al. |
| 7,235,782 | B2 | 6/2007 | Takane et al. |
| 7,305,116 | B2 | 12/2007 | Ikeda |
| 7,507,961 | B2 * | 3/2009 | Toyoda et al. ................ 250/310 |
| 7,923,703 | B2 * | 4/2011 | Morokuma et al. ..... 250/492.22 |
| 7,978,904 | B2 | 7/2011 | Toyoda et al. |
| 8,110,800 | B2 * | 2/2012 | Shishido et al. .............. 250/311 |
| 8,115,169 | B2 * | 2/2012 | Toyoda et al. ................ 250/311 |
| 8,180,140 | B2 * | 5/2012 | Yang et al. .................... 382/144 |
| 8,338,804 | B2 * | 12/2012 | Morokuma et al. ..... 250/492.22 |
| 2001/0048478 | A1 | 12/2001 | Taoka |
| 2002/0175298 | A1 | 11/2002 | Moniwa et al. |
| 2002/0184605 | A1 | 12/2002 | Matsuoka |
| 2005/0086618 | A1 | 4/2005 | Ito et al. |
| 2005/0256669 | A1 * | 11/2005 | Mitsui .......................... 702/123 |
| 2006/0045326 | A1 | 3/2006 | Toyoda et al. |
| 2007/0023653 | A1 | 2/2007 | Toyoda et al. |
| 2007/0098248 | A1 | 5/2007 | Toyoda et al. |
| 2007/0124718 | A1 * | 5/2007 | Kobayashi et al. ............. 716/19 |
| 2007/0272949 | A1 | 11/2007 | Shinomiya et al. |
| 2008/0175469 | A1 | 7/2008 | Toyoda et al. |
| 2008/0235650 | A1 | 9/2008 | Ito et al. |
| 2009/0032710 | A1 | 2/2009 | Ozawa |
| 2009/0136116 | A1 * | 5/2009 | Okai et al. .................... 382/144 |
| 2009/0214102 | A1 * | 8/2009 | Maeda et al. ................. 382/144 |
| 2012/0112067 | A1 * | 5/2012 | Shishido et al. .............. 250/307 |

FOREIGN PATENT DOCUMENTS

| | | |
|---|---|---|
| JP | 2000-266706 | 9/2000 |
| JP | 2000-293690 A | 10/2000 |
| JP | 2000-299361 A | 10/2000 |
| JP | 2002-353280 | 12/2002 |

OTHER PUBLICATIONS

D.H. Ballard, "Generalizing the Hough Transform to Detect Arbitrary Shapes," Pattern Recognition, 1981, pp. 111-122, vol. 13, No. 2, Pattern Recognition Society, Great Britain.

Entire Prosecution of U.S. Appl. No. 12/388,968 to Yasutaka Toyoda et al. filed on Feb. 19, 2009, entitled, "Method and Apparatus of Pattern Inspection and Semiconductor Inspection System Using the Same."

Entire Prosecution of U.S. Appl. No. 11/453,229 to Yasutaka Toyoda et al. filed on Jun. 15, 2006, entitled, "Method and Apparatus Inspection and Semiconductor Inspection System Using the Same."

* cited by examiner

FIG. 7A
(0,0)　　　(9,0)
(0,9)　　　(9,9)
FIG. 7B
FIG. 7C
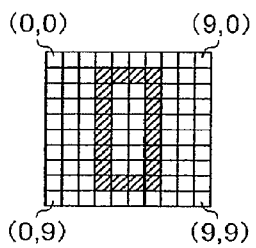
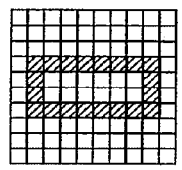
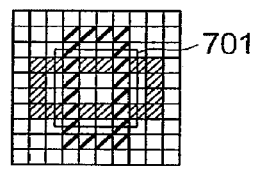
701
FIG. 7D
Layer No1
No1, 4 pnts, (3, 1) (6, 1)
             (6, 8) (3, 8)
FIG. 7E
Layer No2
No1, 4 pnts, (1, 3) (8, 3)
             (8, 6) (1, 6)
FIG. 7F
Layer 1 offset:10
Layer 2 offset:50
Layer No1
 No1, 4 pnts, (3, 1) (6, 1)
              (6, 8) (3, 8)
Layer No2
 No1, 4 pnts, (1, 3) (8, 3)
              (8, 6) (1, 6)
FIG. 7G
702
703
FIG. 7H
704
FIG. 7I
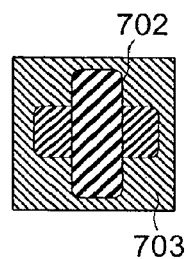
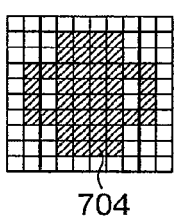
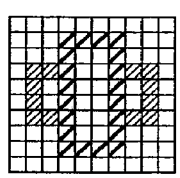
FIG. 7J
Layer 1 offset:10
Layer 2 offset:50
Layer No1
 No1, 4 pnts, (3, 1) (6, 1)
              (6, 8) (3, 8)
Layer No2
 No1, 4 pnts, (1, 3) (3, 3)
              (3, 6) (1, 6)
 No2, 4 pnts, (6, 3) (8, 3)
              (8, 6) (6, 6)

FIG. 11
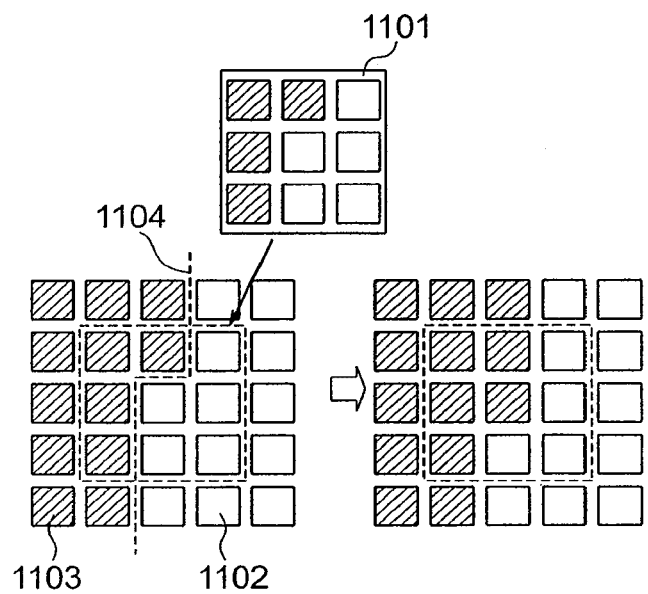
FIG. 12A    FIG. 12B
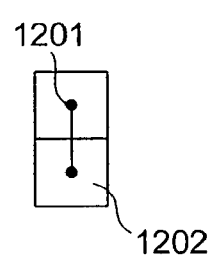
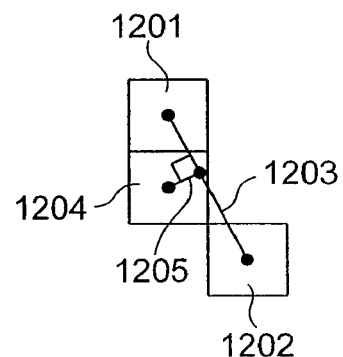

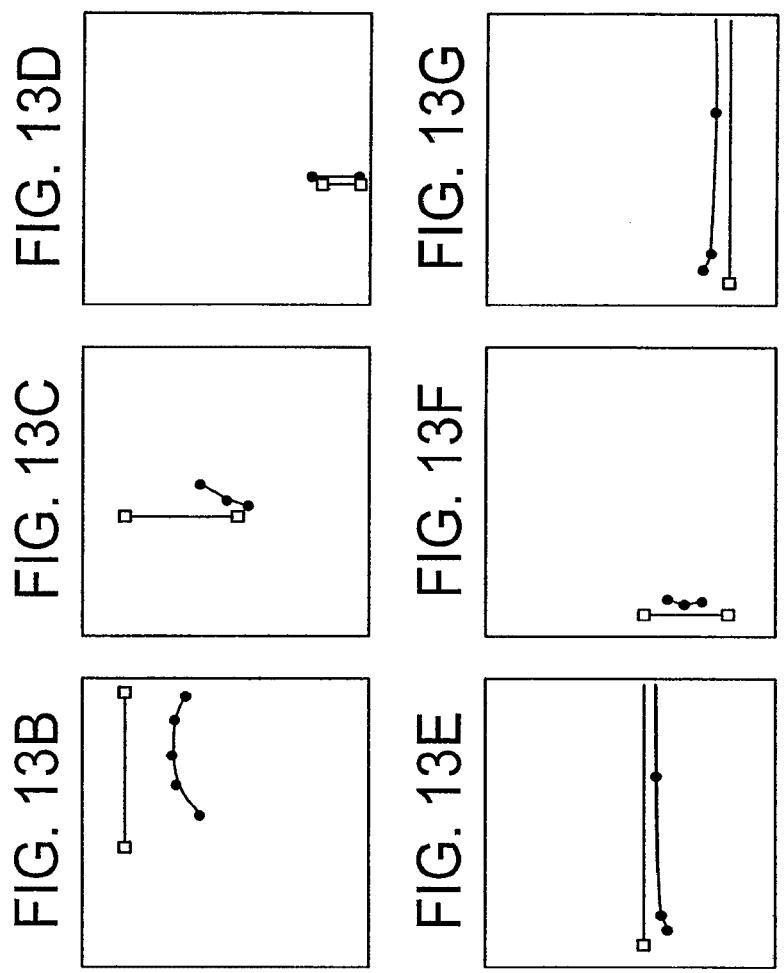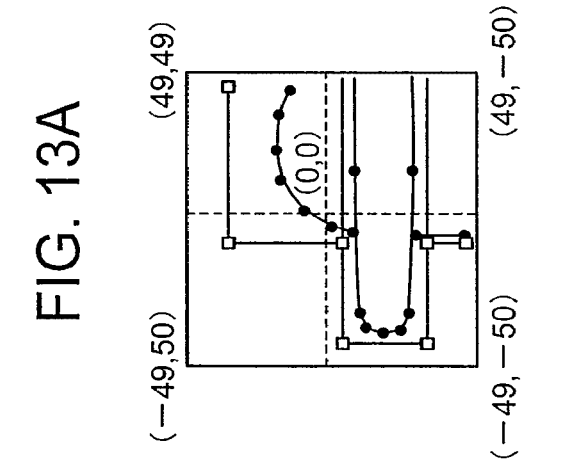

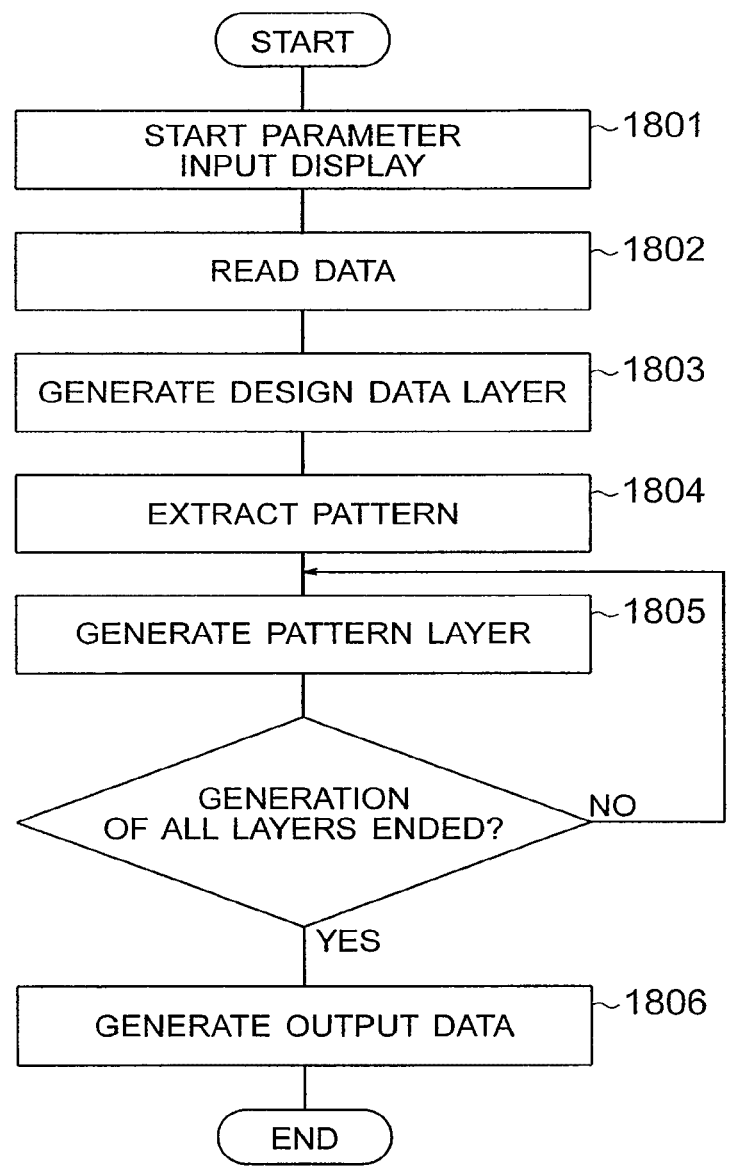

1901

1902

1903

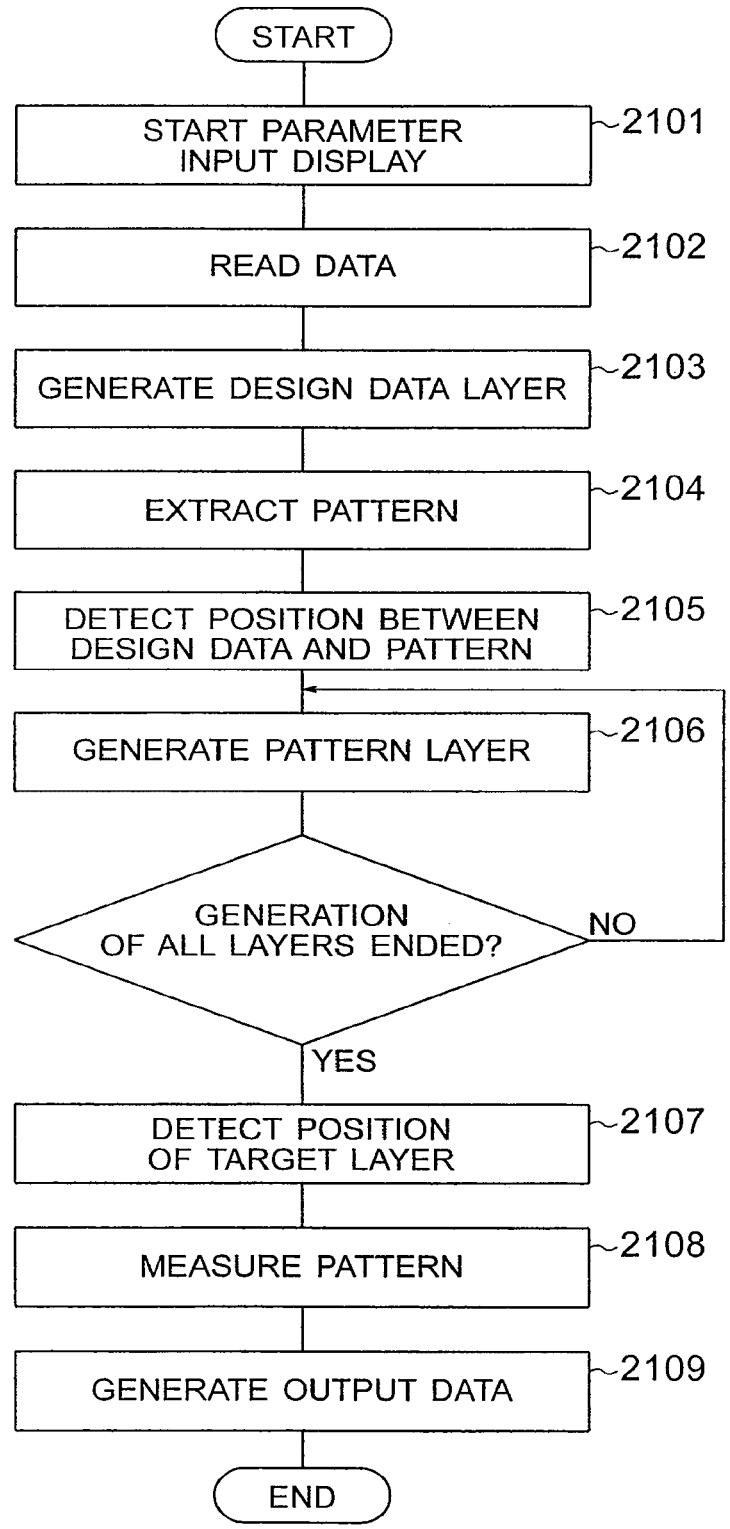

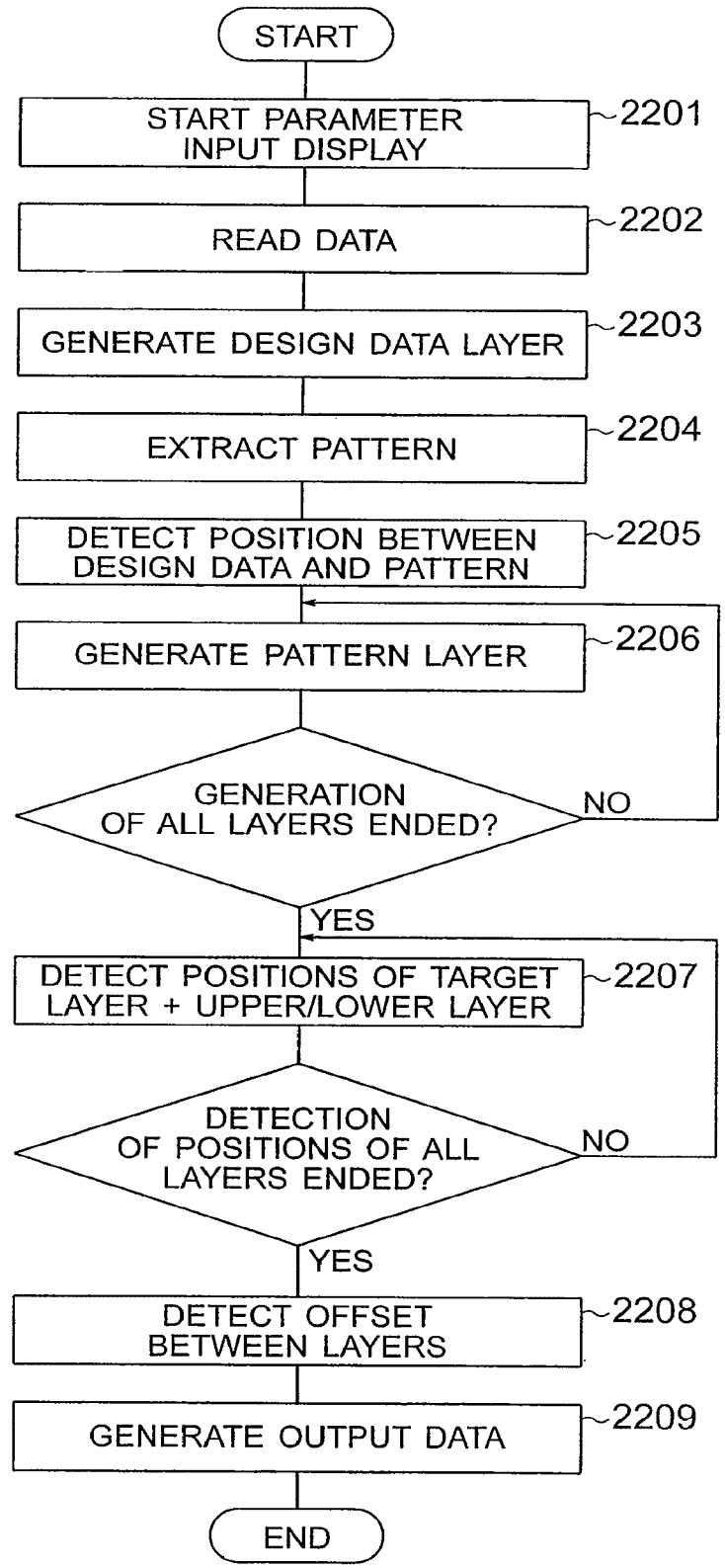

FIG. 23A  FIG. 23B  FIG. 23C
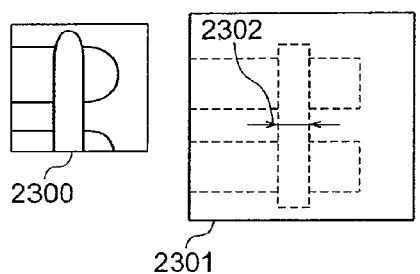
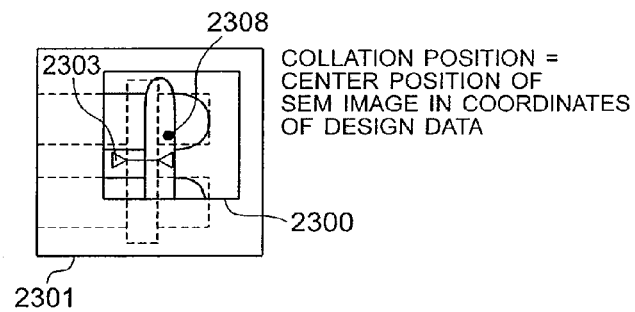
COLLATION POSITION = CENTER POSITION OF SEM IMAGE IN COORDINATES OF DESIGN DATA
FIG. 23D  FIG. 23E  FIG. 23F  FIG. 23G
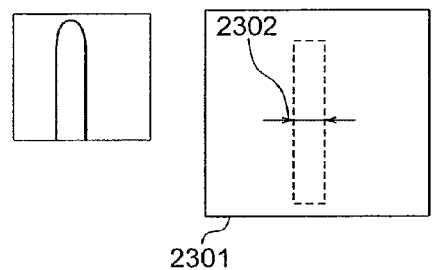
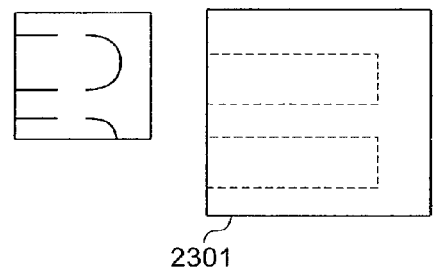
FIG. 23H  FIG. 23I  FIG. 23J
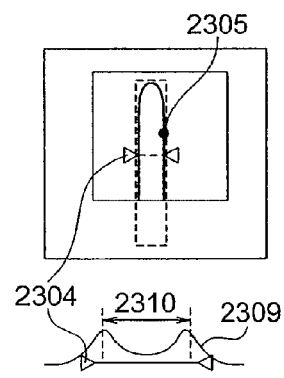
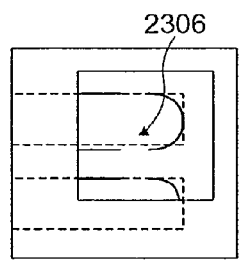
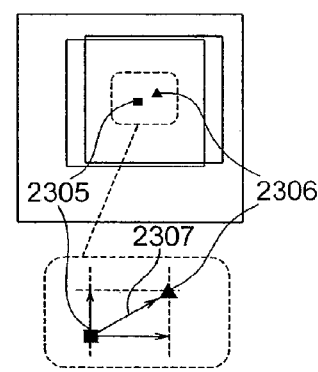

METHOD AND APPARATUS OF PATTERN INSPECTION AND SEMICONDUCTOR INSPECTION SYSTEM USING THE SAME

RELATED APPLICATIONS

This application is a Continuation of U.S. application Ser. No. 12/388,968, filed on Feb. 19, 2009 now U.S. Pat. No. 8,115,169, which is a Continuation of U.S. application Ser. No. 11/453,229, filed on Jun. 15, 2006, now U.S. Pat. No. 7,507,961, claiming priority of Japanese Patent Application No. 2005-177121, filed on Jun. 17, 2005, the entire contents of each of which are hereby incorporated by reference.

BACKGROUND OF THE INVENTION

The present invention relates to a method and apparatus of pattern inspection and a semiconductor inspection system, which inspect a pattern formed on a wafer with use of a photographed image of a semiconductor device and design data on the semiconductor device.

Since recent semiconductor devices are miniaturized, increased in the number of layers, and made complicated in logic; it is highly difficult to manufacture such semiconductor devices. As a result, a frequency of failure caused in a manufacturing process tends to increase and it become important to accurately detect its failure position through inspection. Failures caused by the manufacturing process include pattern deformation caused by improper exposure conditions and continuity failure caused by a positional offset between layers. The locations of such failures are detected by collating design data, such as CAD data (Computer Aided Design data) about a semiconductor device with a pattern formed on a wafer. The semiconductor design data, such as CAD data is used to determine a layout of a pattern to be formed on the semiconductor device. The design data has various formats including GDS and OASIS, which employ, in common, a so-called vector data format wherein a group of feature points of a pattern are described. This is because the high integration of a semiconductor involves an enormous amount of pattern information. In this case, a semiconductor manufacturing apparatus or a semiconductor inspection apparatus using such design data recognizes a pattern shape by drawing a straight line between feature points.

In recent circuit design, an attempt is made to simulate how designed data is distorted by a semiconductor manufacturing process and to control a wiring density and so on on the basis of the simulated result in order to design a failure-proof circuit. For the purpose of increasing the accuracy of the above simulator, a pattern actually formed on a wafer is compared with a distorted pattern based on the design data issued from the simulator, and a difference in shape between the patterns is fed back to the simulator.

One of devices for inspecting a pattern with use of design data and an image of a semiconductor device is proposed in JP-A-2000-293690. In the publication, design data of layers included in a photographed image is used, and matching operation between the design data and a pattern extracted from the photographed image is carried out, to thereby detect a measurement position in the pattern and to measure the pattern.

However, when patterns of a plurality of layers are included in the photographed image, pattern inspection cannot be realized independently for each layer. In other words, the prior art device does not detect layer information about plural layer patterns included in the photographed image, and performs pattern matching operation with the design-data-based pattern of a single layer corresponding to a superposition of the patterns of the plural layers. For this reason, when patterns corresponding to a plurality of layers are included in the photographed image, the prior art device has a problem that the device fails to perform the pattern matching operation under the influence of the patterns of the layers other than a target layer to be inspected and thus cannot accurately measure the pattern.

Also disclosed in JP-A-2000-299361 is a method for performing pattern matching operation between an image of a semiconductor including plural layer patterns and design data of plural layers which added and superimposed offset and for measuring an actual offset. As in the above prior art device, even the disclosed method also has the following problem. Since the detection of layer information is not carried out with respect to a pattern extracted from the photographed image, it is required to increase the measurement accuracy by providing an increased number of variations in the offset upon overlap of the design data. However, this disadvantageously involves an increased processing time, thus reducing an inspection efficiency.

SUMMARY OF THE INVENTION

It is therefore an object of the present invention to provide a pattern inspection apparatus and a semiconductor inspection system which can realize an accurate inspection by measuring a pattern belonging to one of a plurality of layers to be inspected even when patterns of the plurality of layers are included in a photographed image of a semiconductor device.

In accordance with an aspect of the present invention, the above object is attained by providing a pattern inspection apparatus which includes a pattern extractor for extracting pattern data about a semiconductor device from image data obtained by photographing the semiconductor device, and a pattern layer generator for generating pattern data classified according to each layer on the basis of a plurality of design data for each layer corresponding to patterns included in the image data and the extracted pattern data.

In one feature of the pattern inspection apparatus of the present invention, the pattern inspection apparatus includes a position detector for detecting collation positions of the design data and the pattern data for each layer by using the pattern data separated according to each layer.

In another feature of the pattern inspection apparatus of the present invention, the pattern inspection apparatus includes a position detector, when a pattern range included in the design data is different from a pattern range included in the pattern data, for detecting a position of the pattern data relative to the design data area or a collation position of the pattern data relative to the pattern data area.

In further feature of the pattern inspection apparatus of the present invention, the pattern inspection apparatus includes a layer offset detector for detecting a position offset between layers on the basis of the collation position for each layer.

In further feature of the pattern inspection apparatus of the present invention, the pattern inspection apparatus includes a detector for detecting a collation position with use of the design data of a target layer to be inspected and the pattern data corresponding to said target layer generated by the pattern layer generator; and a unit for evaluating a pattern shape from the collation position and a pattern inspection position.

In further feature of the pattern inspection apparatus of the present invention, the pattern layer generator adds information about a layer to which the pattern data belongs to the pattern data classified according to each layer.

In further feature of the pattern inspection apparatus of the present invention, information of a layer to which the pattern data belongs and information on the design data having a correspondence relationship therewith are added to the pattern data classified according to each layer.

In accordance with another aspect of the present invention, the above object is attained by providing a semiconductor inspection system which includes a pattern extractor for extracting pattern data of the semiconductor device from image data generated by irradiating a semiconductor device with an electron beam and by detecting a secondary electron issued from the semiconductor device, and a pattern layer generator for generating pattern data classified according to each layer on the basis of a plurality of pieces of design data for respective layers corresponding to patterns included in the image data and the extracted pattern data.

In one feature of the semiconductor inspection system, pattern inspection of the semiconductor device is carried out by receiving the image data via a network or via a memory.

In accordance with a further aspect of the present invention, the above object is attained by providing a pattern inspection apparatus which includes a pattern extractor for extracting pattern data of a semiconductor device from image data obtained by photographing a semiconductor device, and a position detector for finding a positional relationship between design data and a pattern for each layer on the basis of the design data for each layer corresponding to the pattern included in the image data and the extracted pattern data.

In accordance with yet another aspect of the present invention, the above object is attained by providing a pattern inspection apparatus which includes a pattern extractor for extracting pattern data of a semiconductor device from image data obtained by photographing the semiconductor device, and a pattern layer offset detector for detecting an offset between a plurality of layers on the basis of a plurality of pieces of design data for each layer corresponding to patterns included in the image data and the extracted pattern data.

In one feature of the pattern inspection apparatus of the present invention, an offset between design data of first and second layers and first and second pattern data is found and a difference between position information of the first and second layers is detected on the basis of the design data of the first and second layers corresponding to a pattern included in the image data and the first and second pattern data corresponding to the design data of the first and second layers using the extracted pattern data.

In accordance with a still further aspect of the present invention, the above object is attained by providing a semiconductor pattern display device which includes a pattern extractor for extracting pattern data of a semiconductor device from image data obtained by photographing the semiconductor device, and a pattern data display unit for displaying pattern data classified according to each layer from the extracted pattern data.

In one feature of the semiconductor pattern display device of the invention, the pattern data display unit displays the pattern data classified according to each layer on the basis of design data of a plurality of layers corresponding to patterns included in the photographed image data and the extracted pattern data.

In one feature of the semiconductor pattern display device of the invention, the pattern data display unit displays the design data of the plurality of layers and the extracted pattern data to be overlapped with each other.

In accordance with an additional aspect of the present invention, the above object is attained by providing a pattern inspection method which includes the steps of extracting pattern data of a semiconductor device from image data obtained by photographing the semiconductor device, and generating pattern data classified according to each layer on the basis of a plurality of pieces of design data for each layer corresponding to patterns included in the photographed image data and the extracted pattern data.

In one feature of the pattern inspection method of the invention, collation positions of the design data and the pattern data for each layer are detected by using the design data for each layer and the pattern data separated according to each layer.

In accordance with another aspect of the present invention, the above object is attained by providing a semiconductor inspection method which includes the steps of generating image data by irradiating a semiconductor device with an electron beam and detecting a secondary electron issued from the semiconductor device, extracting pattern data of the semiconductor device from the image data, and generating pattern data classified according to each layer on the basis of a plurality of pieces of design data for each layer corresponding to patterns included in the image data and the extracted pattern data.

In one feature of the semiconductor inspection method of the invention, pattern inspection of the semiconductor device is carried out by receiving the image data via a network or via a memory.

As has been explained above, when patterns for a plurality of layers are included in a SEM image photographed, e.g., by a scanning electron microscope (referred to merely as SEM, hereinafter), the pattern inspection apparatus and the semiconductor inspection system of the present invention can accurately measure one of the patterns belonging to one of the layers to be inspected by utilizing the plurality of pieces of design data about the layers corresponding to the patterns.

Other objects, features and advantages of the invention will become apparent from the following description of the embodiments of the invention taken in conjunction with the accompanying drawings.

BRIEF DESCRIPTION OF THE DRAWINGS

FIGS. 7A to 7J shows the design data and data formats;

FIG. 11 shows a procedure of making thin a line used in the pattern extraction;

FIGS. 12A and 12B show a procedure of a straight line approximation used in the pattern extraction;

FIGS. 13A to 13G show how to generate a pattern layer;

FIG. 18 is a flow chart showing a pattern inspection procedure in the embodiment 1 of the present invention;

FIG. 21 is a flow chart showing a pattern inspection procedure used in the embodiment 3 of the present invention;

FIG. 22 is a flow chart showing a pattern inspection procedure used in the embodiment 4 of the present invention;

FIGS. 23A to 23J show pattern inspection procedures used in the embodiments 3 and 4 of the present invention;

DESCRIPTION OF THE EMBODIMENTS

FIGS. 6A to 6G show an example for explaining the operation of an embodiment of the present invention.

Figure 6A:
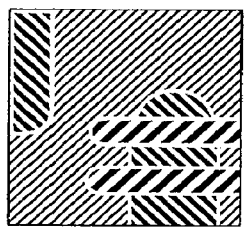
FIGS. 6A to 6G show a relationship between a SEM image to be subjected to pattern inspection and design data.
Figure 6B:
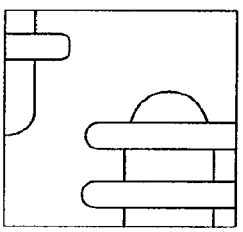
Figure 6C:
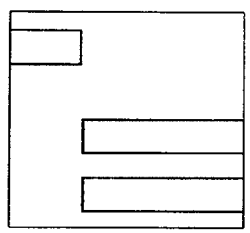
Figure 6D:
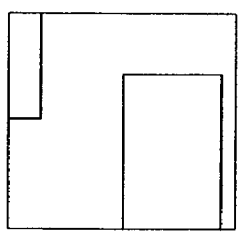
Figure 6E:
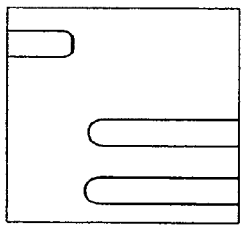
Figure 6F:
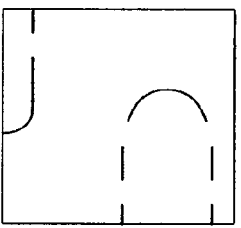

FIG. 6A is an image (which will be referred to as a SEM image, hereinafter) obtained by photographing a pattern on a wafer with use of a scanning electron microscope (SEM). The SEM image includes patterns of design data corresponding to two layers as shown in FIGS. 6C and 6D. In the present invention, such a pattern including the patterns of the plural layers as shown in FIG. 6B is extracted from the SEM image including the patterns corresponding to the design data of the plural layers, and the pattern of FIG. 6B is separated into such patterns for the respective layers as shown in FIGS. 6E and 6F by using the design data of the plural layers of FIGS. 6C and 6D. As a result, the apparatus of the invention can realize pattern evaluation of one alone of the patterns belonging to one of the layers to be evaluated.

Embodiments of the present invention will be explained by referring to the accompanying drawings.

Embodiment 1

In the present embodiment, explanation will be made as to the pattern inspection apparatus of the invention for extracting one alone of the layers specified by an operator or by an electronic computer from a SEM image including patterns of a plurality of layers.

Figure 1:
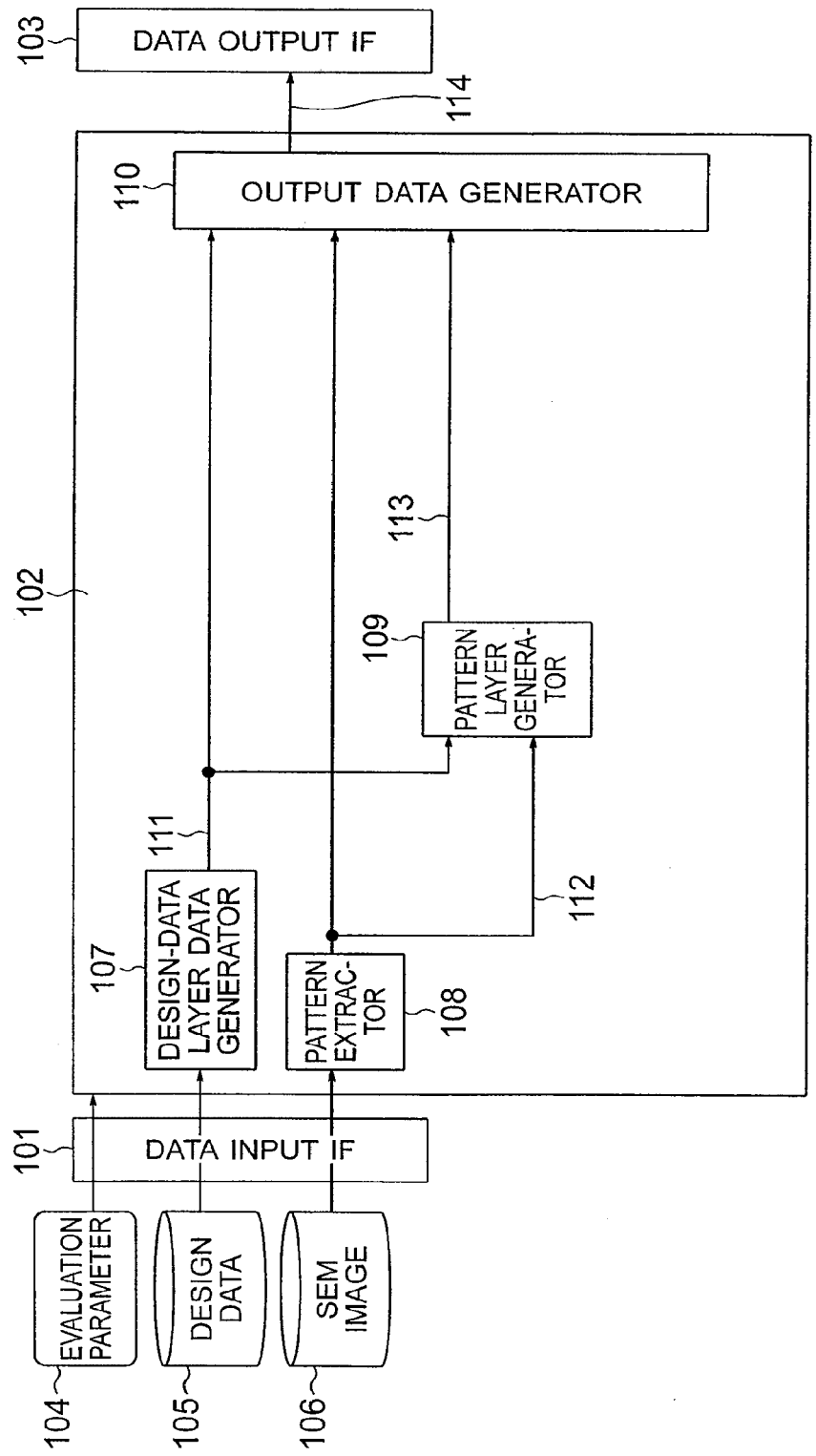
FIG. 1 shows a block diagram of a pattern inspection apparatus in accordance with an embodiment 1 of the present invention.
Figure 5A:
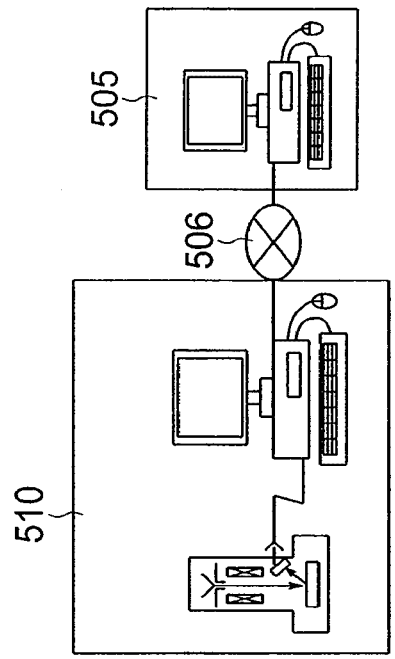
FIGS. 5A and 5B are arrangements of a semiconductor inspection system to which the pattern inspection apparatus is applied respectively.
Figure 5B:
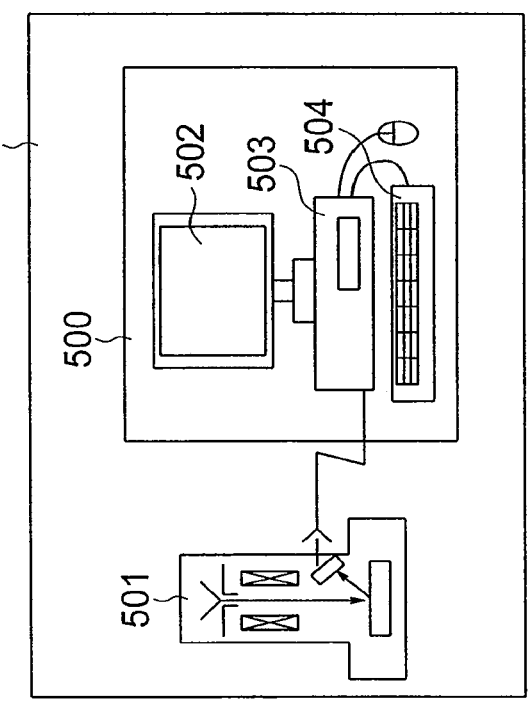

FIG. 1 shows an arrangement of the embodiment 1. The pattern inspection apparatus includes a signal input interface 101, a data calculator 102, and a signal output interface 103. The signal input interface 101 receives a SEM image 106 obtained by photographing a target wafer to be inspected with use of a SEM, design data 105 about a plurality of layers corresponding to pattern images included in the SEM image 106, and various sorts of parameters for evaluation. The data calculator 102 has a design-data layer data layer data of design data generator 107 for generating layer data of design data 111 having a layer structure from the design data 105 of the plural layers, a pattern extractor 108 for extracting pattern data 112 from the SEM image 106, a pattern layer generator 109 for generating pattern layer data 113 having a layer structure from the layer data of design data 111 and the pattern data 112, and an output data generator 110 for generating final output data 114 from the pattern layer data 113. The signal output interface 103 outputs the output data 114 from the data calculator 102. This pattern inspection apparatus can be realized by utilizing an electronic computer 500 of the semiconductor inspection system 510 shown in FIG. 5A or by utilizing an electronic computer 505 which can receive and send data such as a photographed wafer image from a semiconductor inspection system 510 via a network such as a local area network 506 or via a storage such as a hard disk or a compact disk as shown in FIG. 5B.

Explanation will be made as to the constituent elements of the semiconductor inspection system 510 by using the arrangement of FIG. 5A as an example.

The semiconductor inspection system 510 includes a SEM 501 for photographing an image for a semiconductor device and an electronic computer 500. The electronic computer 500 is an information processing apparatus such as a personal computer or a workstation as typical one. The electronic computer 500 has a data processing unit 503 for performing pattern inspection of the present invention, a data input unit 504 for inputting information to control the data processing unit 503, and a data display unit 502 for displaying the photographed image of the SEM 501 or information on pattern inspection and so on.

The data processing unit 503 has a memory for storing the design data 105, the image (SEM image) 106 of a semiconductor device photographed with use of the SEM 501, a control program for the SEM 501, software programs for defining various sorts of processing operations in the data calculator 102 of the pattern inspection apparatus of the invention, and so on. The data processing unit 503 also has a CPU for executing the programs, the signal input interface 101 for inputting an evaluation parameter 104 from the data input unit 504 or the design data 105 or the SEM image 106 to the data processing unit 503, and the signal output interface 103 for outputting a pattern inspection result, the design data 105, or the SEM image 106 to the data display unit 502 such as a CRT or a liquid crystal display. The data input unit 504 is an information input device such as a keyboard or a mouse. The data display unit 502 is an information display device such as a CRT or a liquid crystal display device.

As the signal input interface 101 or the signal output interface 103; an interface such as USB, IEEE1394, Centronics interface, memory card, PCI, or Ethernet™ can be used. As the memory, a data storage device such as SDRAM, SRAM, DRAM, ROM, memory card, or hard disk can be used.

The respective constituent elements of the pattern inspection apparatus of the invention will be detailed by using FIG. 1.

The signal input interface 101 is used to input various sorts of data to the data calculator 102 to perform the pattern inspection of the invention. The pattern inspection apparatus of the invention is intended to extract the output data 114 on the pattern of the inspection target layer from the SEM image 106 including patterns of a plurality of layers. To this end, the apparatus inputs the SEM image 106 of the target semiconductor device to the data calculator 102. The apparatus further inputs the design data 105 about the plurality of layers corresponding to the patterns of the plural layers included in the SEM image 106 to the data calculator 102, and also inputs information about the target layer and about an upper/lower relationship between the layers as the evaluation parameter 104 to the data calculator. In this connection, when information indicative of the upper/lower relationship between layers is described in the design data 105 or is obtained from the identification tile of the design data, it is unnecessary to input this parameter.

The data calculator 102 performs the pattern inspection according to the present invention. The constituent elements of the data calculator 102 will be explained in detail.

The design-data layer data generator 107 generates the layer data of design data 111 having such a layer structure as shown in FIG. 7C from the design data 105 independent for each of such layers as shown in FIGS. 7A and 7B by using the evaluation parameter 104 indicative of the upper/lower relationship between the layers. For easy understanding of the explanation, the layer design data of different colors are overlapped with each other. In this example, the design data of FIG. 7A is superimposed on the design data of FIG. 7B.

In the data format of the design data 105 generally used in a semiconductor industry, a pattern is represented by vector information. Such a pattern as shown in FIG. 7A is described with an apex coordinate value like FIG. 7G to constitute a pattern comprising plural apexes. Similarly, the pattern of FIG. 7B is represented as shown in FIG. 7E.

Thus, from the design data 105 of FIGS. 7D and 7E, the layer data of design data 111 having a layer structure can be expressed in such a format as shown in FIG. 7F. Described in the header of the layer data of design data 111 are layer numbers of the design data 105 included in the layer data of design data 111, an upper/lower relationship between the layers, and offset values indicative of positions of vector data for the layers from which the vector data start. The vector data of the layers are followed by the header.

However, when the design data 105 of the layers is simply embedded in the layer data of design data 111, the lower and upper layers are overlapped with each other in a region 701 as shown in FIG. 7C. FIG. 7G shows the SEM image 106 obtained by photographing a semiconductor device formed based on two pieces of the design data 105. In the region 701 where the upper and lower layers are overlapped with each other, the pattern shape of the layer data of design data 111 shown in FIG. 7C is different from the pattern shape of FIG. 7G. Thus the pattern layer data 113 to be explained later may not be generated accurately in some cases.

The design data 105 is vector data describing a set of such closed figures or patterns as mentioned above. In other words, when the rectangular pattern is expressed by vector data, the expression is in the form of "NO. 1, 4, (x1, y1), (x2, y2), (x3, y3), (x4, y4)". More specifically, the figure of No. 1 has four apexes which have coordinate points of (x1, y1) to (x4, y4) respectively. A region of the closed figure and the other region correspond to a deletion part 703 to be removed and a non-deletion part 702 to be left during formation of the semiconductor device respectively.

For this reason, when the closed figure of the design data 105, for example, shows the non-deletion part, the figure of the lower layer is hidden in a region 704 overlapped between the closed figures of the upper and lower layers. When vector data obtained by deleting vector data of the figure of the lower layer hidden by the upper layer is newly embedded in the layer data of design data 111, the layer data of design data 111 coinciding with such a photographed wafer image as shown in FIG. 7I can be generated. The newly generated layer data of design data 111 is shown in FIG. 7J.

When information indicative of whether the closed figure of the design data 105 corresponds to the deletion part or to the non-deleting part is received from the signal input interface 101 as the evaluation parameter 104, such a layer data of design data 116 can be generated.

The layer data of design data 111 explained above is provided, as an example, to have a data format for realizing the pattern inspection of the present invention. However, the present invention is not limited to this data format but any data format may be employed so long as the data format allows the pattern layer generator 109 to distinguish between the design data 105 of a plurality of patterns corresponding to a plurality of layers included in the SEM image 106.

Figure 8:
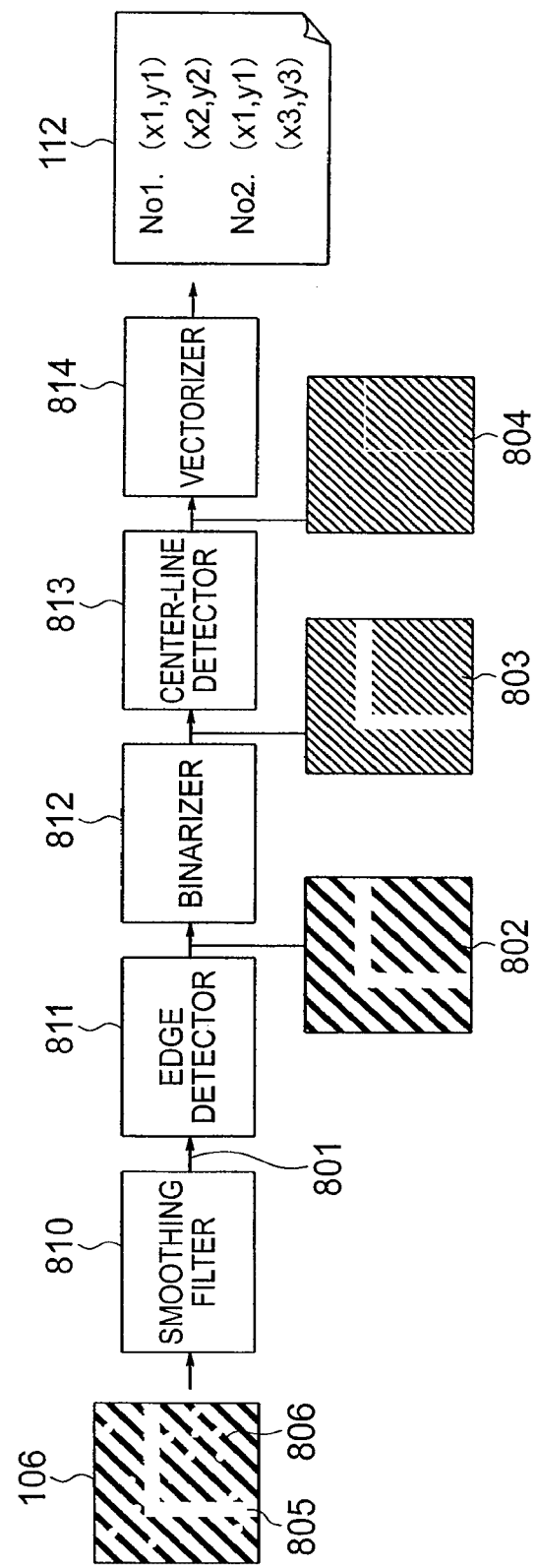
FIG. 8 is a block diagram showing a procedure of extracting a pattern.

The pattern extractor 108 extracts a pattern from such a target SEM image 106 as shown in FIG. 8, and generates pattern data 112 corresponding to vector data similar in format to the design data 105. Since any of the constituent elements of the pattern extractor 108 uses a general image processing technique, the pattern extraction is not limited to the above example. For example, the pattern extraction can be realized by such a method as shown in FIG. 8. Shown in FIG. 8 is a procedure of extracting a pattern image of bitmap data from the SEM image 106 and converting the pattern image to the pattern data 112 as vector data.

A smoothing filter 810 is used to remove a noise component included in the SEM image 106. As shown in FIG. 8, the SEM image 106 has generally a feature that a pixel position 805 present in a pattern has a high brightness (white) and a pixel position 806 present in a region other than the pattern has a low brightness (black). Since various sorts of noise are superimposed on the SEM image due to the characteristic of the SEM, it is required to remove such noise in the pattern extraction. The smoothing filter 810 performs such filtering operation as to find an average value of brightnesses in a two dimensional image region of, e.g., 3 pixels×3 pixels and outputting the average value as a brightness value at a central position of the image region. This can effectively remove high frequency noise from the image. The smoothing filter 810 generates a smoothed image 801. As the smoothing method, a generally known technique can be employed.

Figures 9A, 9B, 10:
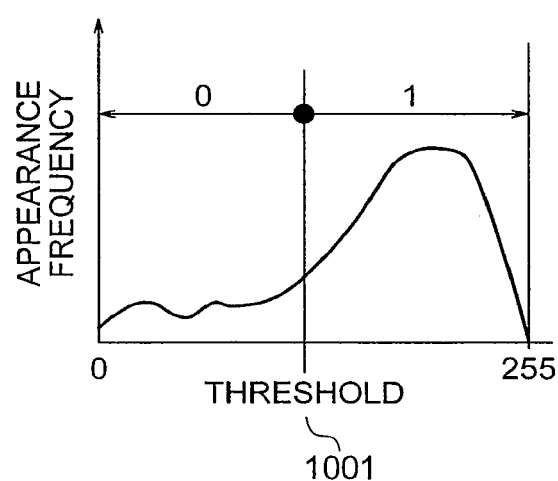
FIGS. 9A and 9B show filter operators used in the pattern extraction respectively.
FIG. 10 shows a histogram of an image used in the pattern extraction.

An edge extractor 811 performs filtering operation on the smoothed image 801 to separate a pattern region from a background region. Various types of edge extracting methods are already proposed and the edge extracting method of the edge extractor 811 is not limited to the illustrated method. Explanation will be made as to, as an example, pattern extracting methods such filter operators as shown in FIGS. 9A and 9B. FIG. 9A shows a filter operator for detecting a vertically-extended pattern from an image, whereas, FIG. 9B shows a filter operator for detecting a horizontally-extended pattern from an image. In the filtering operation, such a filter operator is applied to the region of the image of 3 pixels×3 pixels, and a brightness value of a pixel at the central position is found through product-sum operation of coefficients of the filter operator and brightness values of pixels at the coefficient positions. When the filtering operation is carried out on the smoothed image 801 using the operator of FIG. 9A, an image having an enhanced pattern extended vertically on the display screen can be generated. When the filter operation is carried out on the smoothed image using the operator of FIG. 9B, an image having an enhanced pattern extended horizontally on the display screen can be generated. To this end, the filter operations based on the two operators is carried out on the smoothed image 801, results of the two filtering operations are compared for each pixel so that an image 802 which emphasized the pattern continuing horizontally and perpendicularly can be obtained. As the edge extracting method, a generally known technique can be employed.

Next, the edge image 802 is converted to a binarized image 803. The edge image 802 is a multi-valued image generated through the product-sum operation. Since the edge image 802 still contains a small noise component, the multi-valued image is converted to a binarized image through binarizing operation using a threshold value to completely separate a pattern region from a background region. For a binarizer, various known binarizing methods can be used. Explanation will be made as to the binarizing operation of the binarizer 812, as an example, using a fixed threshold value, though the invention is not limited only to the exemplary binarizing operation. FIG. 10 is a graph called a histogram for an image having an abscissa axis of an image brightness range (0-255 for, e.g., 8 bits/pixel) and an ordinate axis of a total pixel number (10,000 in maximum for an image of, e.g., 100×100 pixels) of brightnesses present in the image. Such a histogram is generally used for the purpose of easily grasping features of an image. The edge image 802, which has high brightness values of pixels in the pattern region and low brightness values of pixels in the other region, can be binarized by providing a threshold value 1001, setting brightness values of pixels having brightness values higher than the threshold value 1001 at a pattern region "1" and setting brightness values of pixels having brightness values lower than the threshold value at a background region "0". Such a threshold value 1001 is generally decided by evaluating some images for use in binarization and experiencially finding it. In addition to the above binarization using the fixed threshold value, there is a binarizing method of automatically finding a threshold value to suitably separate a pattern region from the other region with use of the dispersion of a histogram. Thus, the present invention is not limited only to the aforementioned binarization, and a general known method may be employed for the binarization.

The pattern of the binarized image 803 may have a width corresponding to several pixels depending on the setting of the threshold value 1001. In this case, since the pattern information cannot be converted to vector data, the pattern of the binarized image is converted to a pattern having a width corresponding to one pixel. There are proposed various methods of such conversion, and the present invention is not limited only to the aforementioned conversion. Explanation will be made, as an example, as to a conversion method using line-width narrowing method.

In the line-width narrowing method, as shown in FIG. 11, when a plurality of template images 1101 locally showing a boundary between a pattern 1102 and a background 1103 are used and when a region coinciding with the template images 1101 is detected, a pixel at its central position 1104 is repetitively replaced with the brightness value of the background until the width of the pattern becomes a single center line. In this manner, a pattern image 804 having a line of a width corresponding to one pixel can be generated. As the method for finding the center line of a pattern, a generally known method can be used.

Next, the pattern image 804 having the one-pixel-width line is converted by a vectorizer 814 to vector data, that is, the pattern data 112 having coordinate information between vectors. There are proposed various methods of converting bitmap data to vector data, and the present invention is not limited only to the above method. Explanation will be made, as an example, as to a method of converting a pattern image to vector data by a straight line approximation.

When such patterns as shown in FIGS. 12A and 12B are obtained by a center-line detector 813, a pattern connected from a start point 1201 is referred to. When the pattern has two connected pixels as shown in FIG. 12A, the start and end points 1201 and 1202 of the vector data have two pixel coordinate information. When the pattern has 3 or more connected pixels as shown in FIG. 12B, a straight line 1203 connected between the start and end point 1201 and 1202 is found and a distance 1205 between the straight line and a pixel 1204 present between the start and end points. If the distance 1205 between the straight line 1203 connected by the start and end points 1201 and 1202 and the pixel 1204 present therebetween is within an allowable range, then the pixel 1204 is decided as present on the pixel 1204, and the coordinate values of the start and end points 1201 and 1202 are output. If the distance 1205 between the straight line 1203 and the pixel 1204 is out of the allowable range, then the pattern pixel is decided as not present on the straight line 1203. In this case, a straight line approximation is newly carried out with the pixel 1204 as a start point, and bitmap data of the pattern image 804 formed by a line of a width corresponding one pixel is converted to vector data. In this manner, the pattern data 112 is created having all coordinate points of start and end points of the vector data obtained by the vectorization described therein. In this connection, for the method of converting bitmap data to vector data, a generally known technique can be employed.

The pattern layer generator 109, using the layer data of design data 111 and the pattern data 112, separates patterns in the pattern data 112 into patterns according to each layer, and generates the pattern layer data 113 having the patterns described for each layer.

The layer data of design data 111 and the pattern data 112 are a group of data having design data and coordinate values of start and end points of a straight line forming the shape of the pattern described therein.

When lines (a line forming the layer data of design data 111 will be referred to as a design data straight line and a line forming the pattern data 112 will be referred to as a pattern straight line) forming the layer data of design data 111 and the pattern data 112 are drawn as shown in FIG. 13A. The pattern layer generator 109 detects a correspondence between each of all pattern straight lines forming the pattern data 112 and one of the design data straight lines of the layer data of design data 111 with use of similarities of the distance between the design data straight line and the pattern straight line, directivity, and length as shown in FIGS. 13B to 13G, classifies the pattern straight lines according to layer information to which the design data straight line belongs, and generates the pattern layer data 113 having a layer structure.

Figure 16:
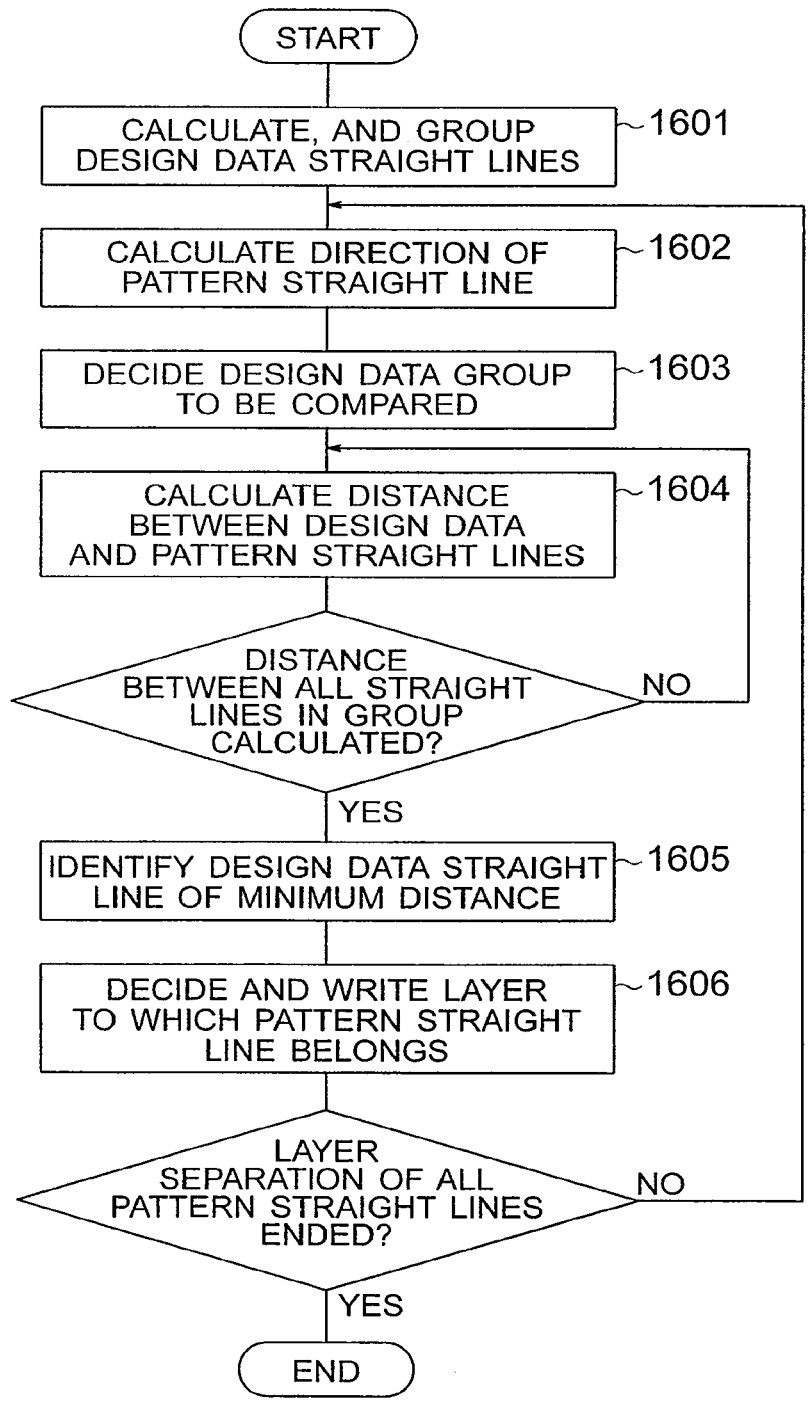
FIG. 16 is a flow chart showing a procedure of generating pattern layer data.

More specifically, the pattern data 112 is converted to the pattern layer data 113 through a flow chart showing such a procedure as shown in FIG. 16. The generation of the pattern layer data can be realized by previously storing a software program based on the flow chart in a memory of the data processing unit 503 of the electronic computer 500 shown in FIG. 5, reading out the program from the memory and executing the program under control of the CPU. The software program first calculates direction information about each design data straight line for each layer, and classifies the design data straight line into groups (step 1601). For example, when a coordinate region of the pattern data 112 is set as shown in FIG. 13A with the central position of the pattern data used as a reference position, the design data straight lines have a direction range of −90° to 90°. Thus, the design data straight lines are classified into groups according to the direction, for example, −90°<group A<−45°, −45°≦group B<0°, 0≦group C<45°, and 45°≦group D≦90°. For example, when the straight line has a start coordinate point (x0, y, 0) and an end coordinate point (x1, y1), direction information on the straight line can be found by using an equation (1) which follows.

If $x1 == x0$: straight line direction = 90°

Else: straight line direction = $(\tan^{-1}((y1-y0)/(x1-x0)) \times 360)/(2\pi)$ (1)

Wherein π is ratio of the circumference of a circle to its diameter.

Figure 14:
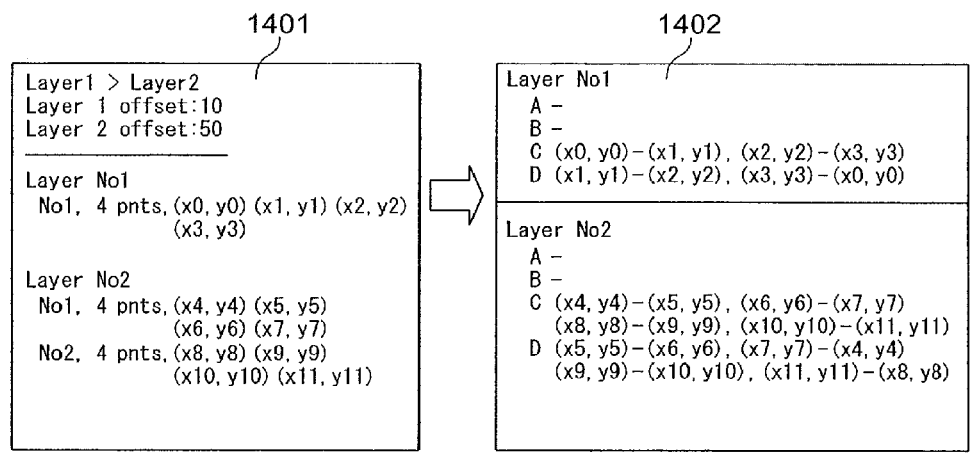
FIG. 14 shows layer data of design data and design data table data.

Utilizing the direction information, a design-data table data 1402 having straight line coordinate points grouped according to the direction for each layer is created from such a layer data of design data 1401 as shown in FIG. 14. The straight line coordinate points have been grouped according to 4 directions in this example. However, the number of such directions may be 2 or 16, and the direction number is not limited to such The software program next finds the direction of the pattern straight line forming the pattern data 112, and detects one of the design data straight lines having the shortest distance from the pattern straight line from the groups in the design-data table data 1402 coinciding with the found direction (step 1602). The direction of the pattern straight line can also be found by using the equation (1). When the direction of a pattern straight line is in a group C range of the design data straight lines, the software program calculates all distances between the design data straight lines in the group C and the pattern straight lines for each layer (step 1604). The simplest method of finding the distance between the straight lines will be explained.

FIGS. 15A to 15D show relationships between design data straight lines in the group D and pattern straight lines having directions corresponding to the group D. In each of the drawings, a y axis is given in a vertical direction, an x axis is given in a horizontal direction, and the direction of each group is given with the x axis as a reference. In the group D, since the straight line has a direction of 45°≤group D≤90° with respect to the x axis, the calculation of a distance between straight lines is carried out using a distance between x coordinate points. The relationships between straight lines in the group can be defined as 4 sorts of simplified states.

Figures 15A, 15B, 15C, 15D:
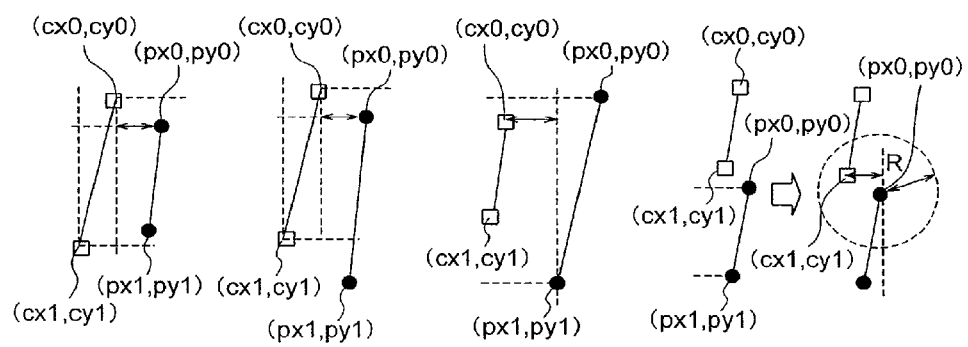
FIGS. 15A to 15D show methods of generating pattern layer data respectively.

FIG. 15A is when both of y coordinate points of two points forming the pattern straight line are included between y coordinate points cy0, cy1 of two points forming the design data straight line. In this case, with regard to x coordinate points cx0, cx1 of the two points on the design data straight line and x coordinate points px0, px1 of the 2 points on the pattern straight line, the program finds distances between the respective x coordinate points, and outputs shortest one of the found distances as a distance between the straight lines.

FIG. 15B is when any one of coordinate points py0, py1 of 2 points forming a pattern straight line is included between y coordinate points cy0, cy1 of 2 points forming a design data straight line. In this case, the software program, using the x coordinate points of the design data straight line included between the coordinate points cy0, cy1, finds distances from the 2 point coordinate points cx0, cx1, and outputs shortest one of the found distances between the x coordinate points as a distance between the straight lines.

FIG. 15C is when y coordinate points cy0, cy1 of 2 points forming a design data straight line are included between y coordinate points py0, py1 of 2 points forming a pattern straight line. In this case, with regard to x coordinate points px0, px1 of the 2 points forming the pattern straight line and x coordinate points cx0, cx1 of the 2 points forming the design data straight line, the software program finds distances between the x coordinate points and outputs shortest one of the found distances between the x coordinate points as a distance between the straight lines.

FIG. 15D is when any of coordinate points py0, py1 of 2 points forming a pattern straight line is not included between y coordinate points cy0, cy1 of 2 points forming a design data straight line. In this case, the program recognizes the straight line as a CAD segment not corresponding to the pattern straight line. For example, the program outputs the distance between the straight lines as a negative value such as −1 so as not to be used in the detection of a final correspondence straight line. When a deformation occurs in the pattern as when the pattern is expanded with respect to the design data, however, the straight line that should correspond may be put, in some cases, in such a condition. In order to cope with it, the software program, for example, compares the y coordinate points cy0, cy1 of the 2 points on the design data straight line and the y coordinate points py0, py1 of the 2 points on the pattern straight line, and detects coordinate points of the design data straight line and the pattern straight line having the shortest distance between y coordinate points. With regard to a region having a radius R with the detected coordinate values of the pattern straight line as its center, when a coordinate point forming the design data straight line is present in the region, the program is designed to output a distance between the x coordinate point of the central position of the region of the radius R and the x coordinate point of the design data straight line within the radius R region as a distance between the straight lines, the program can detect it even when the shape of the pattern is deformed much than the design data. However, since the setting of the radius R at a too large value may cause estimation of a distance between the straight lines that do not correspond, it is desirable to set the radius R at a small value.

Explanation has been made in connection of the case to find a distance between the straight lines in the group D (45°≤group D≤90°). Even for the group C (0°≤group C<45°, a distance between pattern and design data straight lines can be calculated through a procedure similar thereto. However, since the direction of the design data straight lines in the group C is close to the x axis, the detection of a straight line relationship between x coordinate points and the evaluation of a distance between y coordinate points are carried out in a manner reverse to the group D.

For the group A (−90°<group A<−45°), since the direction of the straight line is close to the y axis, a distance between the straight lines can be detected through a procedure similar to the group D. For the group B (−45°≤group B<0°), since the tilt of the straight line is close to the x axis, a distance between the straight lines can be calculated through a procedure similar to the group C.

In this manner, with respect to all the design data straight lines of each layer having similar directions to one pattern straight line, the software program calculates distances between the straight lines. Next, the program one of all the design data straight lines subjected to the straight line distance calculation having the distances from the pattern straight line (step 1605). The design data straight line is a design data straight line corresponding to a pattern. And a layer belonging to this design data straight line is a layer belonging to a pattern. The program performs layer detection on such pattern straight lines with use of all the pattern straight lines within the pattern data 112, and generates the pattern layer data 113 as the pattern data 112 having a layer structure (step 1606).

Figure 24A:
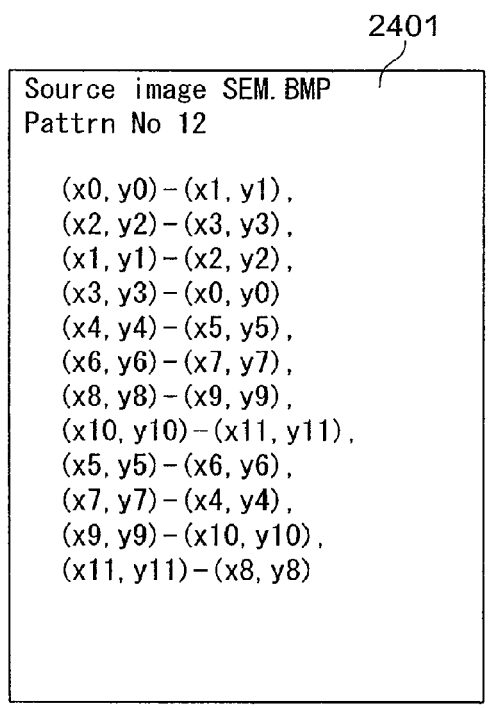
FIG. 24A shows pattern data.
Figure 24B:
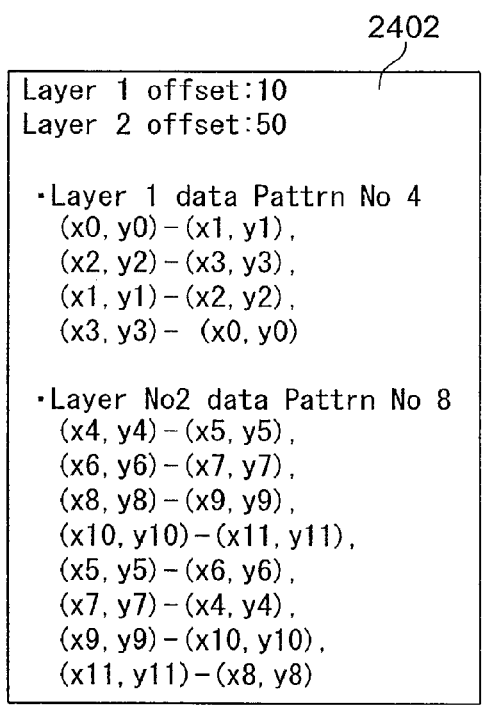
FIG. 24B shows pattern layer data.

FIGS. 24A and 24B show an example of pattern data 2401 (FIG. 24A) generated by the pattern layer generator 109 and an example of pattern layer data 2402 (FIG. 24B) of the layer data of design data 1401. The pattern layer data 113 may have a data format similar to such a data format as shown in FIG. 7J. However, the data format of the pattern layer data 113 is not limited to such a format, and any format can be employed therefore, so long as the format enables distinction between the layer numbers of the pattern straight line data of layers and the layer numbers of the design data corresponding to the layers. It is also possible to generate the pattern layer data 113 which describes a correspondence relationship between the pattern straight line detected by the pattern layer generator 109 and the design data straight line. In this case, for example, when the program detects that the pattern straight line corresponds to the first straight line connected between coordinate points (1, 3) and (3, 3) in a closed figure No. 1 of a layer No. 2 of the layer data of design data shown in FIG. 7J, the program describes coordinate values of the pattern straight line and "layer No. 2/No. 1/(1,3), (3,3)" as information on the design data straight line corresponding to the pattern straight line. When the pattern layer data 113 showing such a correspondence relationship is used, pattern evaluation can be easily realized using the correspondence relationship between the design data and pattern straight lines.

The output data generator 110, on the basis of the evaluation parameter 104 inputted from the signal input interface 101, processes the pattern layer data 113 and generates the output data 114 to be output to the signal output interface 103. The generated data is stored in the memory of the data processing unit 503 of the electronic computer 500 shown in FIG. 5. It is also possible to output the output data 114 to the data display unit 502 such as a monitor or a liquid crystal display unit via the signal output interface 103, and further to transmit the output data 114 to an external device via a communication line or the like.

In this connection, the evaluation parameter 104 includes specification of a data format for the output data 114, specification of a target layer, or the like. The types of the data format include a text file having coordinate values of the pattern straight line described therein as shown in FIG. 7J, an image file corresponding to a bitmap conversion of vector data, and so on. For example, when the output data generator 110 receives a specification saying that the data format is a text file from the signal input interface 101, the output data generator 110 cuts data about the layer No. 1 out of the pattern layer data 113, and outputs it. When an output data generator 110 receives specification saying that the target layers are layers No. 1 and No. 2 and the data format is bitmap file, the output data generator 110 uses pattern layer data 113, and generates and outputs the bitmap file which drew the straight line of a pattern for every layer.

Figure 17A:
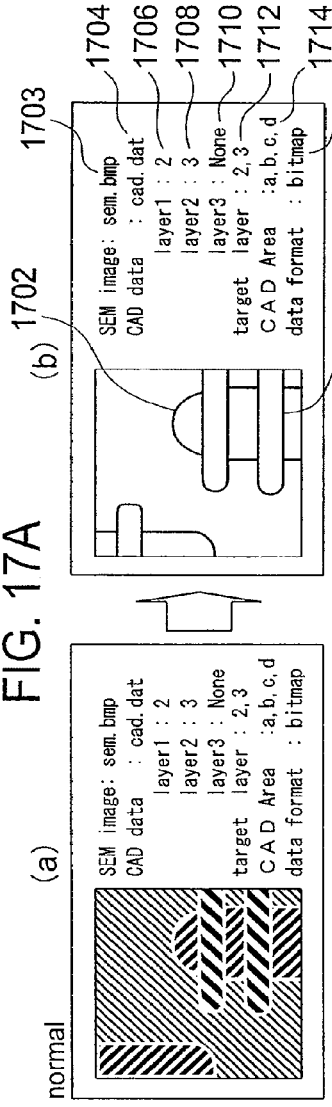
FIGS. 17A to 17C show display screens for entry of various sorts of parameters to execute a pattern inspection function by utilizing a signal output interface in the pattern inspection apparatus of the present invention, SEM images to be inspected, and evaluation results respectively.
Figure 17B:
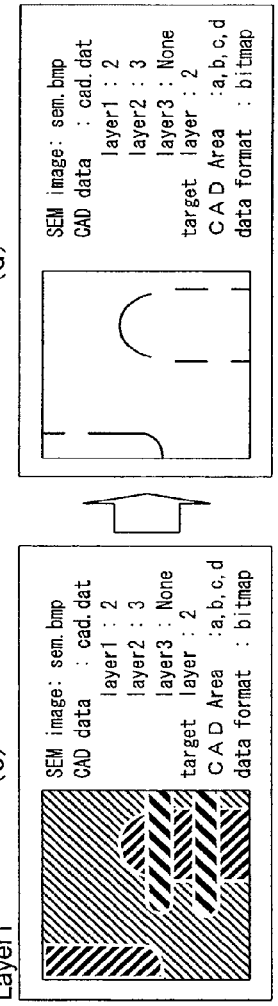
Figure 17C:
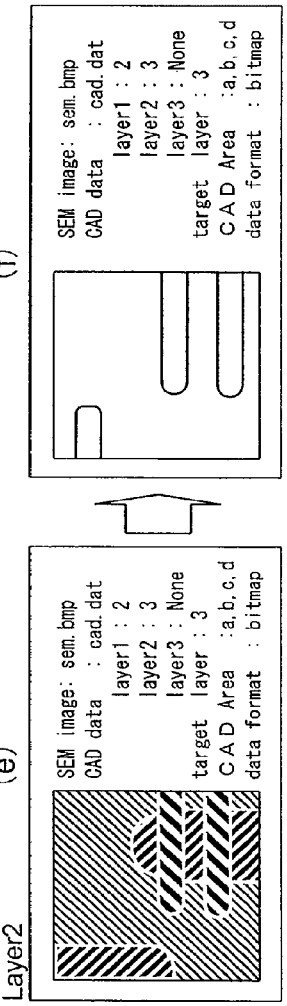

FIGS. 17A to 17C show examples of a display screen of items of various sorts of parameters necessary for the pattern inspection of the invention and results o the patter inspection using the parameters on the data display unit 502 of the electronic computer 500 shown in FIG. 5 respectively. Data to be input to the data calculator 102 include information indicative of the target SEM image 106 to be inspected, information indicative of the design data 105, layer information of a plurality of pieces of design data corresponding to patterns of a plurality of layers included in the SEM image 106, coordinate information indicative of a region of the design data 105 to be used for evaluation, and an output file format. The operator enters such various sorts of data from the data input unit 504 as an information input device such as a keyboard or a mouse via the signal input interface 101 while referring to the data display unit 502. When the design data 105 is divided according to the layers, the data has a format of inputting the design data 105 for each layer.

The input example of FIG. 17A, (a) is used, by utilizing layer data of No. 2 and No. 3 included in design data having a data file name 1704 of 'cad.dat' and a SEM image of a data file name 1703 of 'sem.bmp', to output pattern data corresponding to No. 2 and No. 3 as a bitmap format. Input of such data enables extraction of patterns corresponding to layers No. 2 and No. 3 and also enable acquisition of bitmap data 1716 indicative of patterns of layers No. 2 and No. 3 as shown in FIG. 17A, (b). When the bitmap data is generated from vector data, color information can also be used for the purpose of visually distinguishing a pattern 1701 belonging to the layer No. 2 from a patter 1702 belonging to the layer No. 3. For the pattern of the layer No. 2 for example, a pattern straight line is drawn with pixels having signal values of R=255, G=0, and B=0. When the bitmap data of the layer No. 3 is drawn, a pattern straight line is drawn with pixels having signal values of R=0, G=255, and B=0. Moreover, the bit map data classified by color for every layer is generated by drawing pixels other than a pattern as a signal value of R=0, G=0, and B=0.

FIG. 17B, (c) and (d) show an input example and its result when the layer No. 2 is a target layer with use of design data of the layers No. 2 and No. 3. In the drawing, only the patter 1702 belonging to the layer No. 2 is visually displayed. Similarly, FIG. 17C, (e) and (f) show an input example and its result when the layer No. 3 is a target layer with use of design data of layers No. 2 and No. 3. In the drawing, only the pattern 1701 belonging to the layer No. 3 is visually displayed.

In this manner, in the embodiment of the present invention, when patterns of a plurality of layers are included in a SEM image obtained by photographing a semiconductor wafer, pattern data belonging to the target layer can be individually displayed in addition to pattern data of a plurality of layers.

FIG. 18 is a flow chart showing a processing procedure of the pattern inspection apparatus of the invention. When a software program based on the flow chart is previously stored in the memory in the data processing unit 503 of the electronic computer 500 shown in FIG. 5 and is read out and executed under control of the CPU upon the pattern inspection of the invention, the pattern inspection of the invention can be realized.

After activation of the software program, a display screen for entry of various sorts of parameters shown in FIGS. 17A, 17B, and 17C for pattern inspection is outputted through a signal output interface (step 1801). The program reads out an entered parameter and stores it in the memory (step 1802). The program reads out a plurality of specified design data from the memory and generates the layer data of design data 111 (step 1803). The program reads out the specified SEM image from the data storage, extracts a pattern therefrom, and generates the pattern data 112 (step 1804). With respect to all the pattern straight lines forming the pattern data 112, the program detects a design data straight line in the corresponding layer data of design data 111, and generates the pattern layer data 113 corresponding to addition of the pattern straight line to layer information to which the design data straight line belongs (step 1805). On the basis of the output format of the pattern data 112 specified by the signal input interface 101, the program processes the pattern data 112 (step 1806), and outputs the processed data to the memory or the signal output interface 103.

As has been explained above, the pattern inspection apparatus of the invention can extract only the pattern of the target layer from the SEM image including the patterns of a plurality of layers, by using the design data of the plurality of layers corresponding to the patterns. As a result, the apparatus can perform pattern inspection on the target layer while avoiding the influences of the patterns other than the target layer.

Embodiment 2

Figure 2:
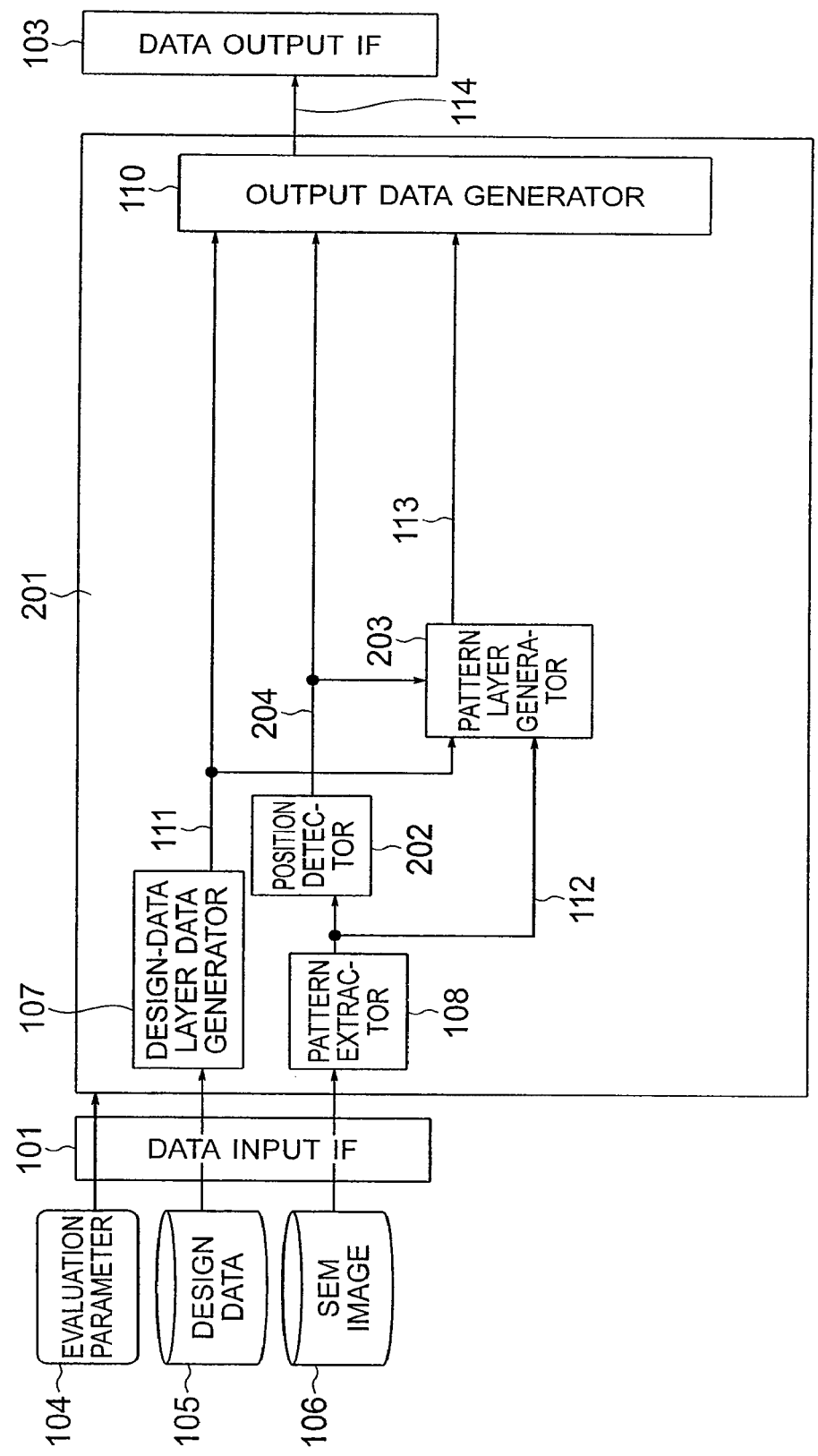
FIG. 2 shows a block diagram of a pattern inspection apparatus in accordance with an embodiment 2 of the present invention.

Explanation will next be made as to another embodiment. FIG. 2 shows an arrangement of an embodiment 2.

Figure 6G:
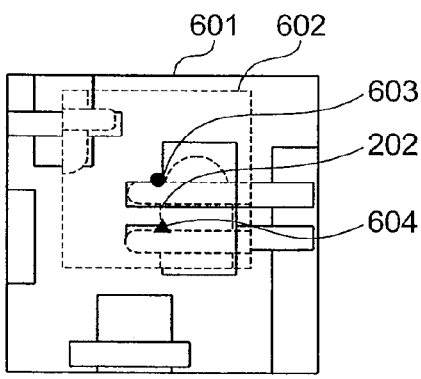

In the present embodiment, a position detector 202 is added to the pattern inspection apparatus shown in the embodiment 1. Thus, when a region 601 having design data is different from a region 602 having a pattern of a SEM image as shown in FIG. 6G, the present embodiment performs accurate pattern extraction of a target layer by automatically detecting the position of the pattern corresponding to the design data. In FIG. 6G, a black circle denotes a center position 603 of the SEM image, and a black triangle denotes a center position 604 of the design data.

The pattern inspection apparatus of the invention will be explained.

Figure 19A:
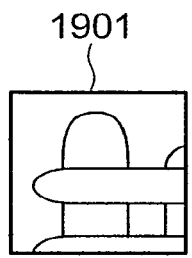
FIGS. 19A to 19C show a position detection procedure.
Figure 19B:
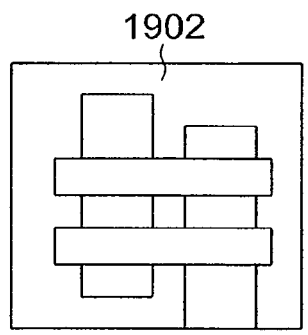
Figure 19C:
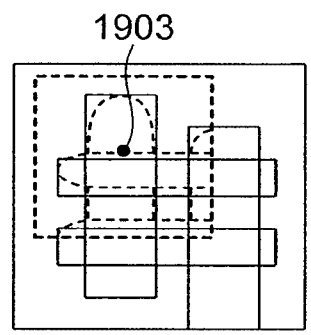

Since the constituent elements of the embodiment 2 other than the position detector 202 and a pattern layer generator 203 are the same as those in the embodiment 1, explanation will be made as to only the position detector 202 and the pattern layer generator 203. The position detector 202 automatically detects a collation position 204 between the layer data of design data 111 and the pattern data 112 on the basis of the layer data of design data 111 from the design-data layer data generator 107 and the pattern data 112 from the pattern extractor 108. More specifically, the position detector performs pattern matching operation between the layer data of design data 111 and the pattern data 112, and outputs its matching positions as the collation position 204. In a simple method, this can be realized by using a design data image 1902 (FIG. 19B) corresponding to a conversion of the design data straight lines forming the layer data of design data 111 to bitmap data and a SEM image 1901 (FIG. 19A) corresponding to a conversion of pattern straight lines forming the pattern data 112 to bitmap data as shown in FIGS. 19A to 19C and by applying such a pattern matching approach as to detect a center position 1903 (FIG. 19C) to be collated with the SEM image 1901 from the design data image 1902 on the basis of the similarity of a density distribution of pixels in the image. In the example of FIGS. 19A to 19C, the center position 1903 is determined with a wiring position of a lower layer of the SEM image 1901 in the design data image 1902 as a reference, the wiring position of an upper layer of the SEM image 1901 is different from that of the design data image 1902. As a method for generating bitmap data from start and end points of a straight line, a generally known method can be employed.

Even for the pattern matching approach, one of generally-known various techniques can be employed. And a line pattern template matching technique such as a Generalized Hough Transform using vector information can be favorably realized even when an slight offset occurs between images to be collated in shape. Further, vector data generated by the design-data layer data generator 107 and the pattern extractor 108 can be used as vector information. Thus, in the pattern inspection of the invention, we can say that this method of detecting the collation position 204 is effective. The details of the Generalized Hough Transform is described in Ballad, D. H, "Generalizing the Hough Transform to Defect Arbitrary Shapes, Pattern Recognition", 13, 2, pp. 111-122 (1981). In this way, many types of pattern matching approaches applicable to the position detector 202 are already proposed, and thus various pattern matching approaches can be applied thereto.

The pattern layer generator 203 basically performs processing operation similar to the pattern layer generator 109 explained in the embodiment 1. When a distance between CAD and pattern straight lines is found, however, the pattern layer generator 203 uses SEM image in design data obtained by the position detector 202 or position information of the design data in the SEM image. When the collation position 204 detected by the position detector 202 indicates a distance (1x, 1y) from the center position of the layer data of design data 111 to the center position of the pattern data 112 as shown in FIG. 6G, the program converts all coordinate values ((cad_x(n), cad_y(n)) of the layer data of design data 111 to coordinate values ((cad_x'(n), cad_y'(n)) of the pattern data 112 using an equation (2) which follows, finds a distance between the CAD and pattern straight lines. As a result, the distance between the straight lines considering the collation position 204 can be realized.

$$cad\_x'(n)=cad\_x(n)-1x$$

$$cad\_y'(n)=cad\_y(n)-1y \quad (2)$$

Figure 20:
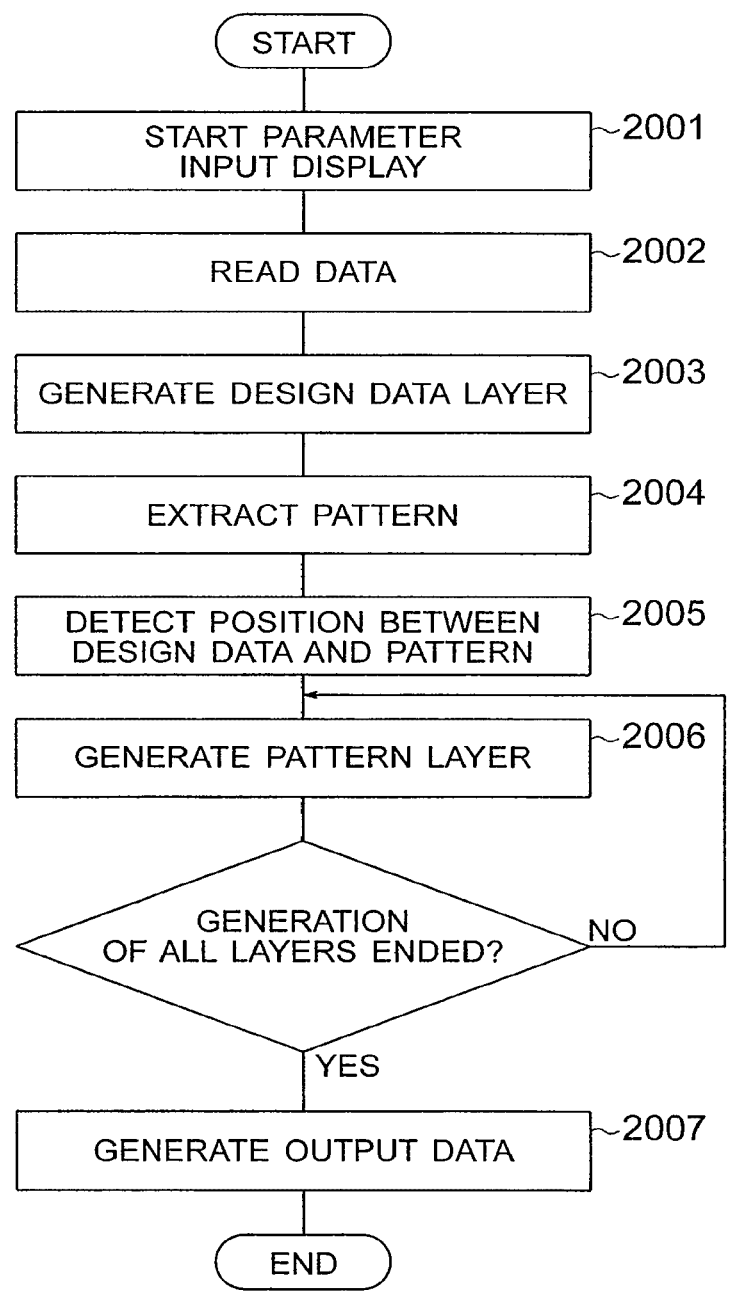
FIG. 20 is a flow chart showing a pattern inspection procedure used in the embodiment 2 of the present invention.

FIG. 20 is a flow chart showing a processing procedure of the embodiment 2. A software program based on this flow chart is previously stored in the memory of the data processing unit 503 of the electronic computer 500 shown in FIG. 5. Upon pattern inspection of the invention, the program is read out from the memory and executed under control of the CPU, thus enabling the pattern inspection of the invention.

After being executed, the program causes a display screen for entry of various types of parameters as shown in FIGS. 17A to 17C to be outputted through the signal output interface to realize the pattern inspection (step 2001). The program reads the entered parameters and stores them in the memory (step 2002). The program reads out design data of a plurality of specified layers from the memory and generates the layer data of design data 111 (step 2003). The program also reads out the specified SEM image from the memory, extracts a pattern therefrom, and generates the pattern data 112 (step 2004). The program performs pattern matching operation between the layer data of design data 111 and the pattern data 112, and detects a collation position of the pattern data 112 relative to the layer data of design data 111 or a collation position of the layer data of design data 111 relative to the pattern data 112 (step 2005). With respect to all pattern straight lines forming the pattern data 112, the program performs coordinate transformation of such lines using information about the collation position 204, detects design data straight lines in the corresponding layer data of design data 111, and generates the pattern layer data 113 corresponding to an addition of layer information to which design data straight lines belong to pattern straight lines (step 2006). On the basis of the output format of data specified by the signal input interface, the program processes the pattern layer data 113 (step 2007), and outputs the processed data to the memory or the signal output interface 103.

When the collation position 204 is known, results similar to the pattern inspection results of the invention can be obtained by entering the collation position from the signal input interface 101 to the pattern layer generator 203 as the evaluation parameter 104.

As mentioned above, when a region having design data is different from a region having a pattern of an SEM image, the pattern inspection apparatus of the invention automatically detects a position of a pattern corresponding to the design data. Thus the apparatus can make accurate correspondence between the design data and pattern straight lines and perform pattern extraction of a target layer.

Embodiment 3

Explanation will then be made as to a further embodiment of the present invention.

Figure 3:
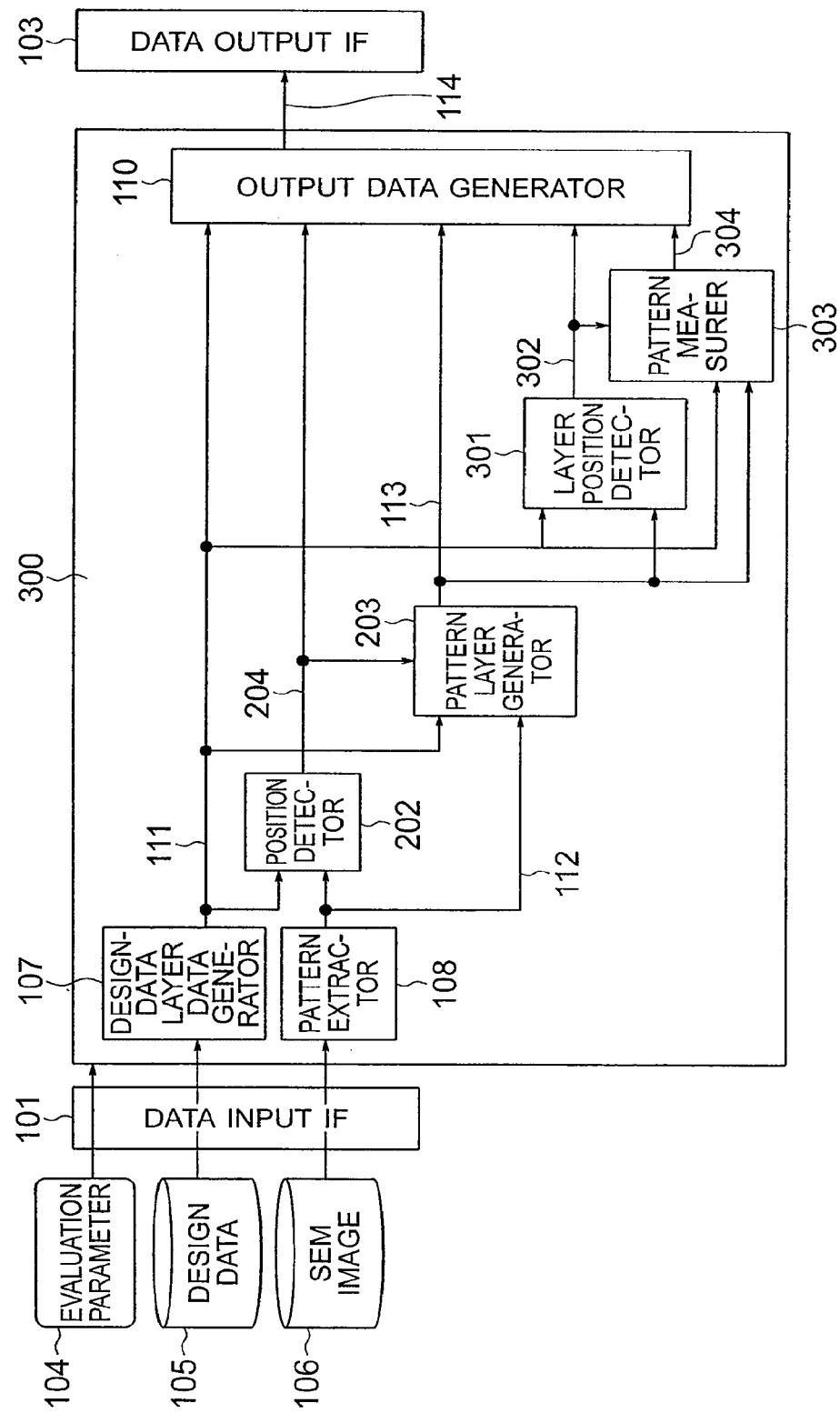
FIG. 3 shows a block diagram of a pattern inspection apparatus in accordance with an embodiment 3 of the present invention.

FIG. 3 shows an arrangement of an embodiment 3.

In the present embodiment, a layer position detector 301 for performing position detection to identify an inspection position on a pattern by using a pattern of a target layer and design data as well as a pattern measurer 303 for identifying the inspection position on the pattern on the basis of a detected position result and performing pattern measurement inspection, are added to the pattern inspection apparatus shown in the embodiment 1 or 2. Explanation will be made as to a pattern inspection apparatus of the present embodiment which can detect a measurement position using only the pattern of a target layer alone and can measure the pattern.

The layer position detector 301 is used to detect a position of a target pattern from a SEM image 2300 showing such pattern data as shown in FIG. 23A. More specifically, an inspection point 2302 for length measurement in design data 2301 is previously determined, so that the layer position detector detects a collation position 2308 of the SEM image 2300 indicating pattern data in the design data 2301 by such a pattern matching as explained in the embodiment 2. The collation position 2308 indicates a center position of the SEM image in coordinates of design data. The inspection point 2302 of the design data 2301 corresponds to a pattern measurement position 2303 of the SEM image. Position information about the inspection point in the design data is input to a data calculator 300 as the evaluation parameter 104.

As already explained in connection with the prior art, the shape of a pattern formed on a semiconductor device is, in many cases, subjected to deformation such as expansion or shrinkage or to shift between upper and lower layers compared with the shape of design data. For example, even when position detection is carried out to inspect the pattern of the upper layer, a measurement position in the upper layer cannot be accurately detected, in some cases, due to the deformation of the pattern of the lower layer or to a very small offset between the layers. FIG. 23C shows an example when detection of the pattern measurement position 2303 ends in a failure because accurate position detection cannot be carried out under the influence of the pattern of the lower layer.

To avoid this, the layer data of design data 111 and the pattern layer data 113 explained in the embodiment 1 or 2 are used. As a result, the apparatus can perform position detection between the pattern of the target layer and the design data of the target layer and can perform suitable position detection while avoiding the influence of the design data or pattern other than the target layer.

More in detail, the apparatus generates the pattern layer data 113, extracts the design data of the target layer as shown in FIG. 23D from the layer data of design data 111, and then extracts a pattern of the target layer as shown in FIG. 23E from the pattern layer data 113. The apparatus performs such pattern matching operation as mentioned in the embodiment 2 using the extracted design data and pattern, and finds a pattern collation position 2305 in the design data as shown in FIG. 23H. The pattern collation position 2305 indicates the center position of the SEM image in design data system 2301. In the target layer, a pattern of inspection points in the design data 2301 is present.

The pattern measurer 303 is used to detect a pattern measurement/inspection position from the inspection point 2302 of the target layer, and measure a width between the patterns or the like. More specifically, the pattern measurer detects a pattern measurement position 2304 to measure a length of the pattern corresponding to the inspection point on the design data on the basis of the design data of the target layer and the pattern collation position 2305 of the pattern data, finds a distance between peaks of the profile at the pattern measurement position 2304 for the length measurement by using a pattern brightness profile 2309 or the like, and thereby measures a width 2310 between the patterns, as shown in FIG. 23H.

FIG. 21 is a flow chart showing a processing procedure of the embodiment 3. A software program based on this flow chart is previously stored in the memory of the data processing unit 503 of the electronic computer 500 shown in FIG. 5. Upon the pattern inspection of the present invention, the CPU reads out the program and executed it, enabling the pattern inspection of the invention.

After being activated, the software program causes display of a display screen for entry of various sorts of parameters on a signal output interface to perform such pattern inspection as shown in FIG. 17 (step 2101). The program reads out an entered parameter and stores it in the memory (step 2102). The program reads out design data of a plurality of specified layers from the memory, and generates the layer data of design data 111 (step 2103). The program reads out a specified SEM image from the memory, extracts a pattern therefrom, and generates the pattern data 112 (step 2104). The program performs pattern matching operation between the layer data of design data 111 and the pattern data 112, and detects a position of the pattern data 112 relative to the layer data of design data 111 or a position of the layer data of design data 111 relative to the pattern data 112 (step 2105). With regard to all pattern straight lines forming the pattern data 112, the program detects a design data straight line in the corresponding layer data of design data 111, and generates the pattern layer data 113 corresponding to an addition of layer information to which the design data straight line belongs to the pattern straight line (step 2106). On the basis of information about a target layer entered through the signal input interface, the program performs pattern matching operation between the pattern data 112 of the target layer and the design data, and detects a position of the pattern data 112 relative to the design data or a position of the layer data of design data 111 relative to the pattern data 112 (step 2107). The program detects a pattern measurement position corresponding to an inspection point of the set design data and measures the pattern (step 2108). The program generates output data based on the measured result (step 2109), and outputs output data to the signal output interface (step 2109).

Although explanation has been made in connection with the example having a single target layer in the above procedure, it is also possible to set a plurality of target layers. In this case, this can be easily implemented by setting a plurality of target layers as the evaluation parameter 104 and repeating a position detection step 2107 of the target layer and a pattern measurement step 2108 by the number of times corresponding to the number of such target layers.

Through the above operations, the pattern inspection apparatus of the invention performs detection an accurate measurement/inspection position and pattern measurement with use of the design data and pattern of the target layer alone, while avoiding the influence by the pattern of the layer other than the target layer. The apparatus performs pattern measurement independently for each layer.

Embodiment 4

Explanation will be made as to yet another embodiment of the present invention.

Figure 4:
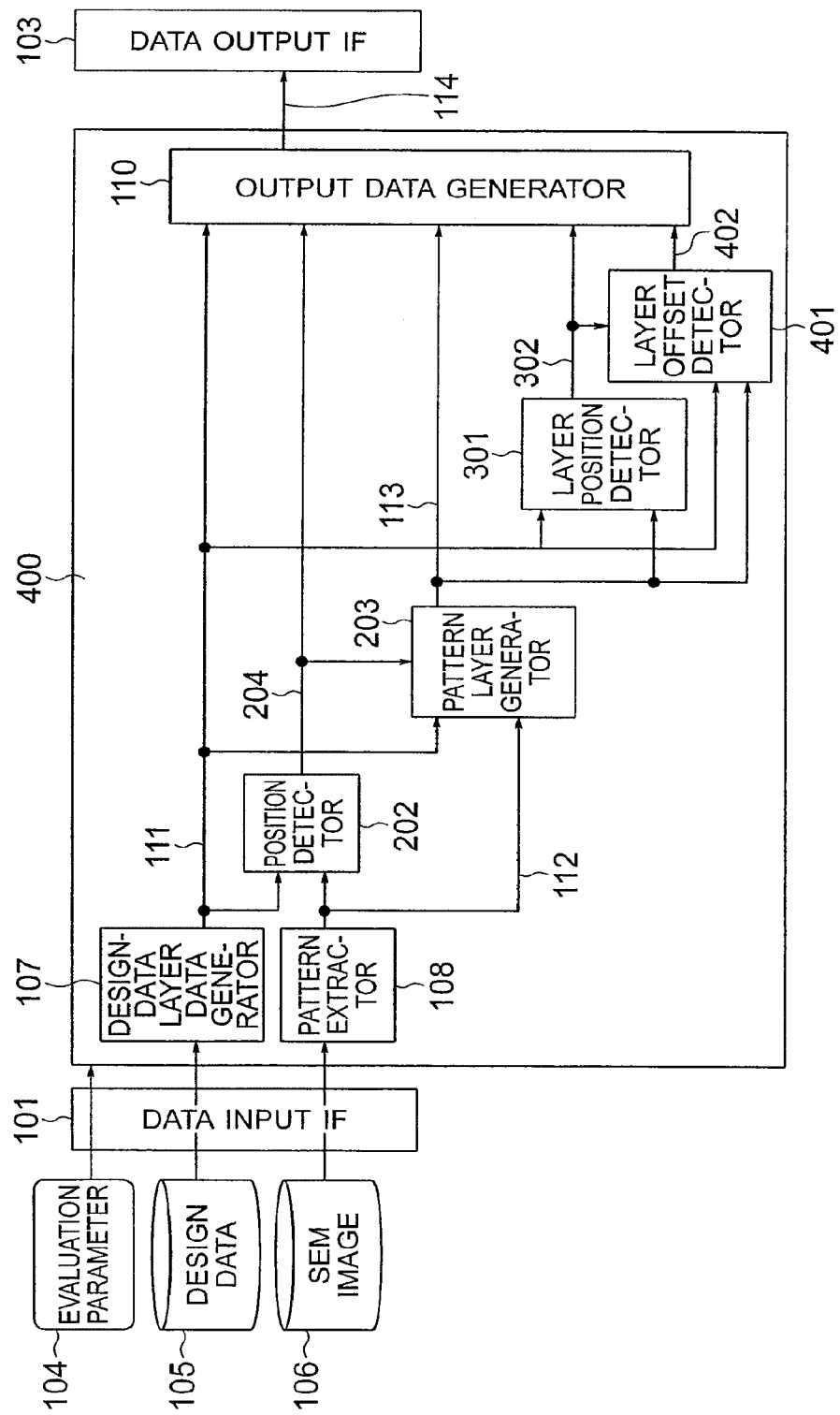
FIG. 4 shows a block diagram of a pattern inspection apparatus in accordance with an embodiment 4 of the present invention.

FIG. 4 shows an arrangement of an embodiment 4.

The present embodiment corresponds to the pattern inspection apparatus shown in the embodiment 1 or 2, but a layer position detector 301 shown in the embodiment 3 and a layer offset detector 401 for finding a difference between layer positions through the layer position detector 301 and outputting the found difference as an offset between the layers are added thereto. Through the above operations, the present embodiment detects a defect such as improper continuity caused by a pattern offset between layers. More specifically, with respect to a target layer and an upper or lower layer thereof, the apparatus performs position detection of design data and the pattern data 112 through the layer position detector 301, finds a position difference therebetween, and outputs the found difference value as an inter-layer offset 402. For example, the apparatus performs pattern matching operation between such a pattern as shown in FIG. 23D and design data shown in FIG. 23E corresponding to the layer of the pattern of FIG. 23D, and detects a pattern collation position 2305 of the upper layer in the design data through the layer position detector 301. Similarly, the apparatus performs pattern matching operation between such a pattern as shown in FIG. 23F and design data shown in FIG. 23G corresponding to the layer of the pattern of FIG. 23F, and detects a collation position 2306 of the lower layer in the design data through the layer position detector 301. As shown in FIG. 23J, a difference 2307 between the 2 layer positions 2305 and 2306 corresponds to an offset between the upper and lower layers.

FIG. 22 is a flow chart showing a processing procedure of the embodiment 4. A software program based on this flow chart is previously stored in the memory of the data processing unit 503 of the electronic computer 500 shown in FIG. 5. Upon the pattern inspection of the present invention, the CPU reads out and executes the program to thereby perform the pattern inspection of the invention.

After executing the software program, the apparatus displays a display screen for entry of various sorts of parameters on the signal output interface for such pattern inspection as shown in FIG. 17 (step 2201). The program reads out an entered parameter and stores it in the memory (step 2202). The program reads out design data of a plurality of specified layers from the memory and generates the layer data of design data 111 (step 2203). The program reads out specified SEM image from the memory, extracts a pattern therefrom, and generates the pattern data 112 (step 2204). The program performs pattern matching operation between the layer data of design data 111 and the pattern data 112, and detects the collation position 204 of the pattern data 112 relative to the layer data of design data 111 or the collation position 204 of the layer data of design data 111 to the pattern data 112 (step 2205). With respect to all pattern straight lines forming the pattern data 112, the program detects a design data straight line in the corresponding layer data of design data 111, and generates the pattern layer data 113 corresponding to an addition of the layer information to which the design data straight line belongs to the pattern straight line (step 2206). On the basis of a target layer entered through the signal input interface and information about an upper of lower layer thereof, the program performs pattern matching operation between the pattern data 112 and the design data for each layer, and detects a collation position 302 of the pattern data 112 relative to the design data or a collation position 302 of the layer data of design data 111 relative to the pattern data 112 (step 2207).

The program finds a difference between the position information about the target layer and layer position information to detect an inter-layer offset (step 2208), generates output data on the basis of the found difference value (step 2209), and outputs the output data to the signal output interface 103.

With such an arrangement as mentioned above, the pattern inspection apparatus of the present invention performs pattern position detection for each layer, and detects an offset between layer on the basis of a difference in position information between layers. When the inter-layer offset exceeds a certain allowable value, the present invention can be used to reconsider the process.

Each of the examples of FIGS. 23A to 23J can be displayed on the data display unit 502 of the electronic computer 500 similarly to the embodiment of FIG. 5.

The explanation of the foregoing embodiments has been made in connection with the example of mainly using the SEM system. However, the present invention is not limited to only the application to the SEM system, but may be applied even to a system, for example, for optically photographing a pattern image on a wafer.

As has been explained in the foregoing, the aforementioned pattern inspection apparatus and the semiconductor inspection system can be used, for example, for a SEM system. Thus, when patterns of a plurality of layers are included in a SEM image for an example, the apparatus or system can measure the pattern belonging to a target layer by using a plurality of pieces of design data for each layer corresponding to the pattern.

Further, by using pattern data and design data for each layer, the invention can perform pattern inspection different for different layers or can detect a pattern positional offset between layers.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A pattern measuring apparatus comprising:
a processor configured to measure a pattern dimension of an object of a semiconductor device based on image data obtained by a scanning electron microscope,
wherein the processor is further configured to perform the machine-implemented steps of:
selecting design data of the measured object from the design data of the semiconductor device;
performing a pattern recognition using the selected design data, such that the measured object is recognized from the image data which is obtained by the scanning electron microscope including a plurality of overlapped patterns; and
measuring the recognized measured object.

2. The pattern measuring apparatus according to claim 1, wherein the processor recognizes the measured object by a pattern matching using the selected design data.

3. The pattern measuring apparatus according to claim 1, wherein the processor measures a dimension between a first line constituting the measured object of the design data and a second line which is included in the image data obtained by the scanning electron microscope.

4. The pattern measuring apparatus according to claim 3, wherein the processor recognizes the second line being the nearest to the first line as a line constituting the measured object on the image data.

5. The pattern measuring apparatus according to claim 3, wherein the processor measures the dimension between the first line and the second line for each first line.

6. A pattern measuring apparatus comprising:
a processor configured to measure a pattern dimension of an object of a semiconductor device based on image data which is obtained by a scanning electron microscope,
wherein the processor is further configured to perform the machine-implemented steps of:
- selecting design data of a specific layer which includes the measured object from the design data of the semiconductor device;
- performing a pattern recognition using the selected design data, such that the measured object is recognized from the image data which is obtained by the scanning electron microscope including a plurality of overlapped patterns; and
- measuring the recognized measured object.

7. The pattern measuring apparatus according to claim 6, wherein the processor recognizes the measured object by a pattern matching using the selected design data.

8. The pattern measuring apparatus according to claim 6, wherein the processor measures a dimension between a first line constituting the measured object of the design data and a second line which is included in the image data obtained by the scanning electron microscope.

9. The pattern measuring apparatus according to claim 8, wherein the processor recognizes the second line being the nearest to the first line as a line constituting the measured object on the image data.

10. The pattern measuring apparatus according to claim 8, wherein the processor measures the dimension between the first line and the second line for each first line.

* * * * *